United States Patent
Kurz et al.

(10) Patent No.: US 9,400,941 B2
(45) Date of Patent: *Jul. 26, 2016

(54) METHOD OF MATCHING IMAGE FEATURES WITH REFERENCE FEATURES

(75) Inventors: Daniel Kurz, Munich (DE); Peter Meier, Munich (DE)

(73) Assignee: Metaio GmbH, Munich (DE)

( * ) Notice: Subject to any disclaimer, the term of this patent is extended or adjusted under 35 U.S.C. 154(b) by 107 days.

This patent is subject to a terminal disclaimer.

(21) Appl. No.: 14/240,988

(22) PCT Filed: Aug. 31, 2011

(86) PCT No.: PCT/EP2011/065002
§ 371 (c)(1),
(2), (4) Date: May 16, 2014

(87) PCT Pub. No.: WO2013/029674
PCT Pub. Date: Mar. 7, 2013

(65) Prior Publication Data
US 2015/0161476 A1    Jun. 11, 2015

(51) Int. Cl.
*G06K 9/36*  (2006.01)
*G06K 9/62*  (2006.01)
(Continued)

(52) U.S. Cl.
CPC .......... *G06K 9/6202* (2013.01); *G06K 9/46* (2013.01); *G06K 9/4671* (2013.01);
(Continued)

(58) Field of Classification Search
CPC ..... G06K 9/6202; G06K 9/46; G06K 9/4671; G06T 7/0044; G06T 7/2033; G06T 2207/30244; G06T 2207/30181

USPC ......... 382/190, 100, 141, 145, 181, 209, 212, 382/214, 304, 276, 302, 103, 278, 107
See application file for complete search history.

(56) References Cited

U.S. PATENT DOCUMENTS 7,768,534 B2    8/2010  Pentenrieder et al.
8,189,925 B2 *  5/2012  Kroepfl et al. ................ 382/216
(Continued)

FOREIGN PATENT DOCUMENTS

WO    2011047888    4/2008

OTHER PUBLICATIONS

Johnson, "Learning Depth in Lightfield Images, CS229", Machine Learning Autumn 2005.
(Continued)

*Primary Examiner* — Sheela C Chawan
(74) *Attorney, Agent, or Firm* — Blank Rome LLP

(57) ABSTRACT

A method of matching image features with reference features comprises the steps of providing a current image, providing a set of reference features, wherein each of the reference features comprises at least one first parameter which is at least partially indicative of a position and/or orientation of the reference feature with respect to a global coordinate system, wherein the global coordinate system is an earth coordinate system or an object coordinate system, or at least partially indicative of a position of the reference feature with respect to an altitude, detecting at least one feature in the current image in a feature detection process, associating with the detected feature at least one second parameter which is at least partially indicative of a position and/or orientation of the detected feature, or which is at least partially indicative of a position of the detected feature with respect to an altitude, and matching the detected feature with a reference feature by determining a similarity measure.

25 Claims, 15 Drawing Sheets

(51) Int. Cl.
- *G06K 9/46* (2006.01)
- *G06T 7/20* (2006.01)
- *G06T 7/00* (2006.01)

(52) U.S. Cl.
CPC .......... *G06T 7/0044* (2013.01); *G06T 7/2033* (2013.01); *G06T 2207/30181* (2013.01); *G06T 2207/30244* (2013.01)

(56) References Cited

U.S. PATENT DOCUMENTS

| | | | | |
|---|---|---|---|---|
| 8,693,785 | B2* | 4/2014 | Suk et al. | 382/201 |
| 8,942,418 | B2* | 1/2015 | Kurz et al. | 382/103 |
| 8,970,690 | B2* | 3/2015 | Meier et al. | 348/135 |
| 9,088,673 | B2* | 7/2015 | Banner et al. | |
| 2004/0090444 | A1 | 5/2004 | Satoh | |

OTHER PUBLICATIONS

D.G. Lowe "Distinctive Image Features from Scale Invariant Keypoints", Int. J. Comput. Vision 60, 2 (Nov. 2004), pp. 91-110.

Kumar et al. "Experiments on Visual Loop Closing Using Vocabulary Trees", Computer Vision and Pattern Recognition (CVPR) Workshops, Jun. 2008.

Bleser et al. "Advanced Tracking Through Efficient Image Processing and Visual Inertial Sensor Fusion", Computer & Graphics, vol. 33, pp. 59-72, Feb. 2009.

Chen et al. "City-Scale Landmark Identification on Mobile Devices", IEEE International Conference on Computer Vision and Pattern Recognition, Jun. 2011.

Reitmayr et al. "Initialization for Visual Tracking in Urban Environments", Proceedings of the 2007 6th IEEE and ACM International Symposium on Mixed and Augmented Reality, Mar. 2007, pp. 1-9.

Schall et al. "Global Pose Estimation Using Multi-Sensor Fusion for Outdoor Augmented Reality", Proceedings of the 2009 8th IEEE International Symposium on Mixed and Augmented Reality, 2009.

Arth et al. "Wide Area Localization on Mobile Phones", Proceedings of the 2009 8th IEEE International Symposium on Mixed and Augmented Reality, Mary 2009, pp. 73-82.

Bleser et al. "Fast and Stable Tracking for AR Fusing Video and Inertial Sensor Data", Jan. 30, 2006, http://iason.fav.zcu.cz/wscg2006/papers_2006/short/c03-full.pdf.

Kurz et al. "Inertial Sensor-Aligned Visual Descriptors", CVPR 2011, Jun. 1, 2011, pp. 161-166.

Fong et al. "Computer Vision Centric Hybrid Tracking for Augmented Reality in Outdoor Urban Environments", Proceedings of the 8th International Conference on Virtual Reality Continuum and its Applications in Industry, Jan. 1, 2009, p. 185.

Satoh et al. "A Hybrid Registration Method for Outdoor Augmented Reality", Augmented Reality, 2001, pp. 67-76.

Santos et al. "Supporting Outdoor Mixed Reality Applications for Architecture and Cultural Heritage", Proceedings of the 2010 Spring Simulation Multiconference, Jan. 1, 2010, p. 1.

* cited by examiner

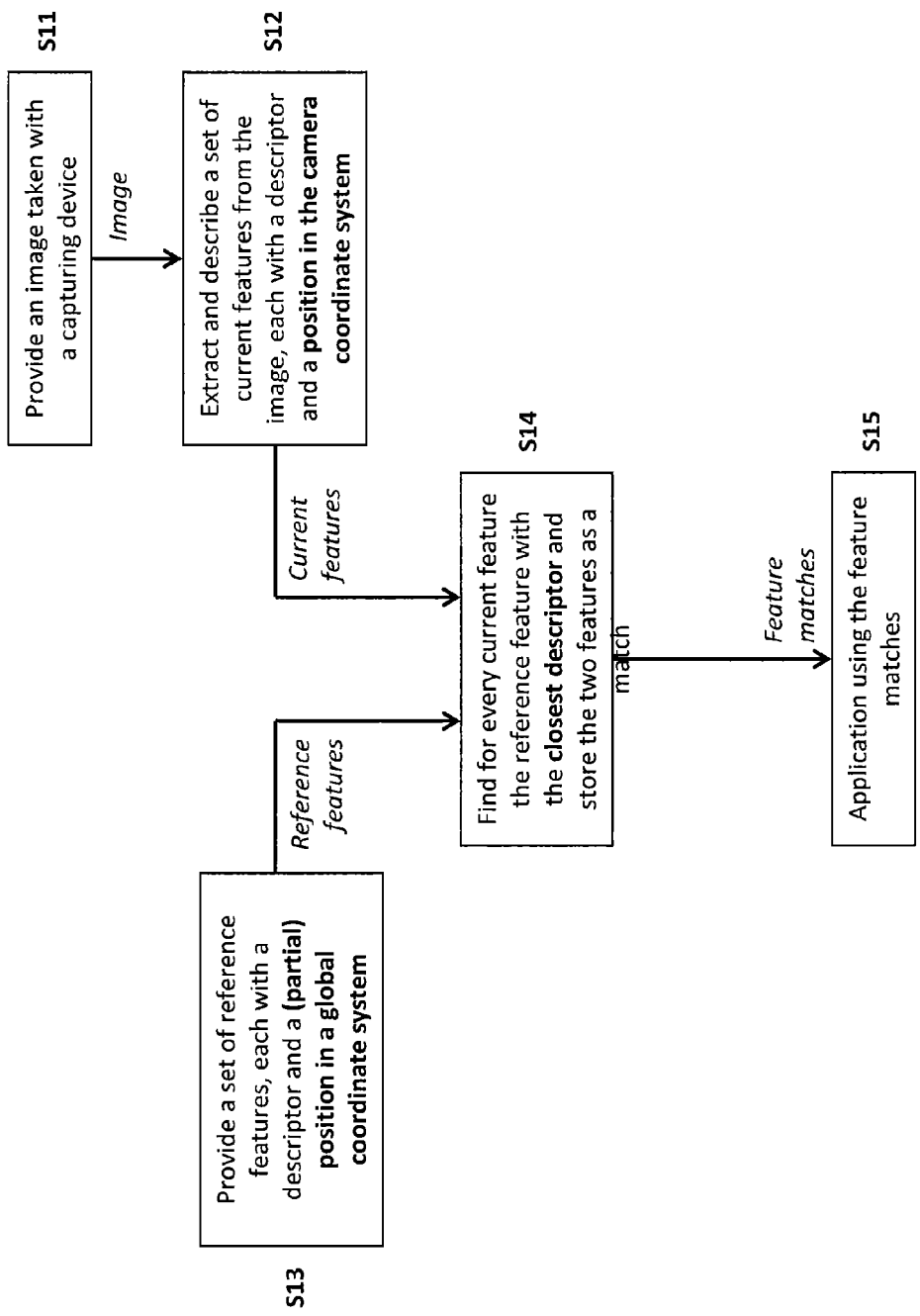

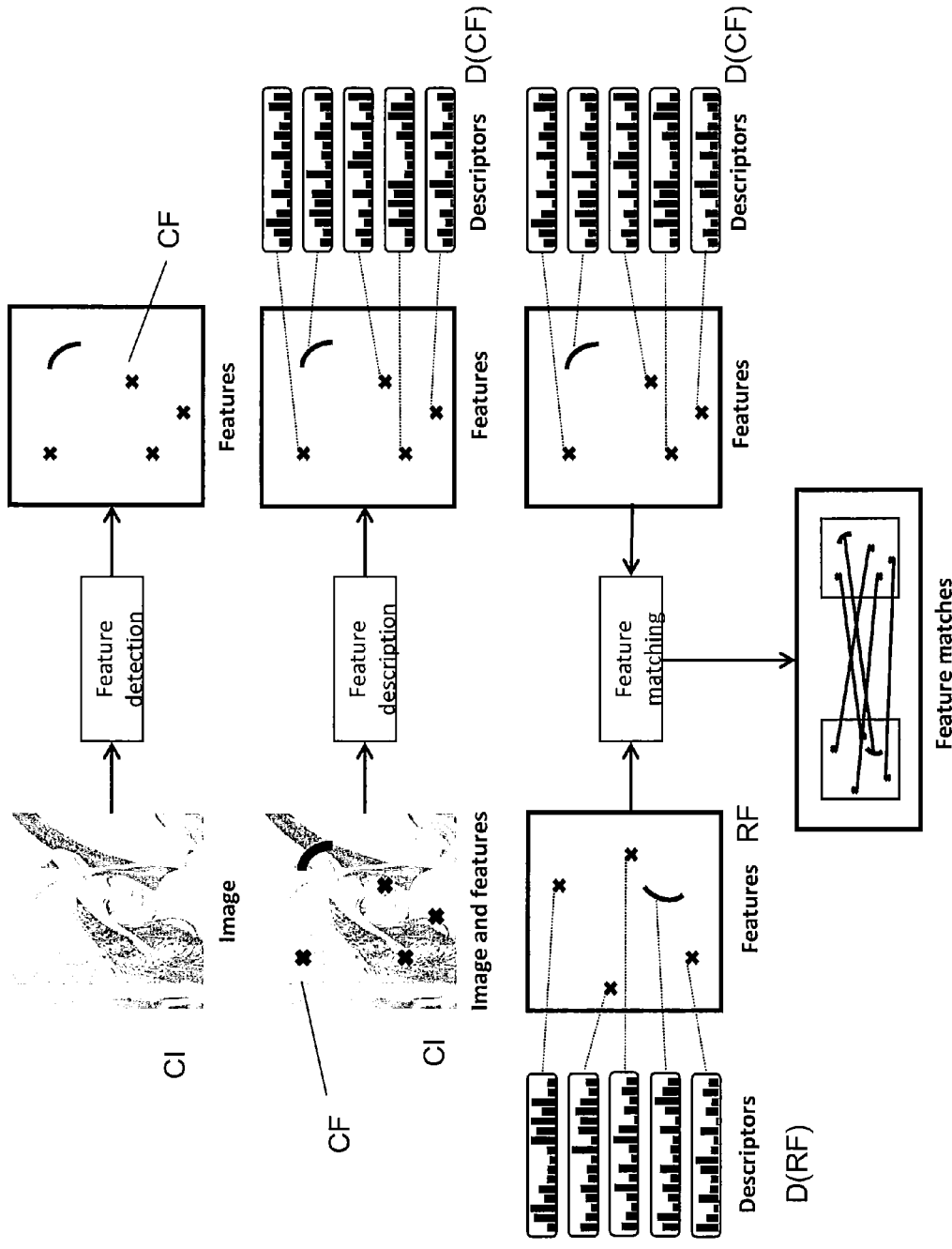
Figure 1B: Detection, description and matching of features

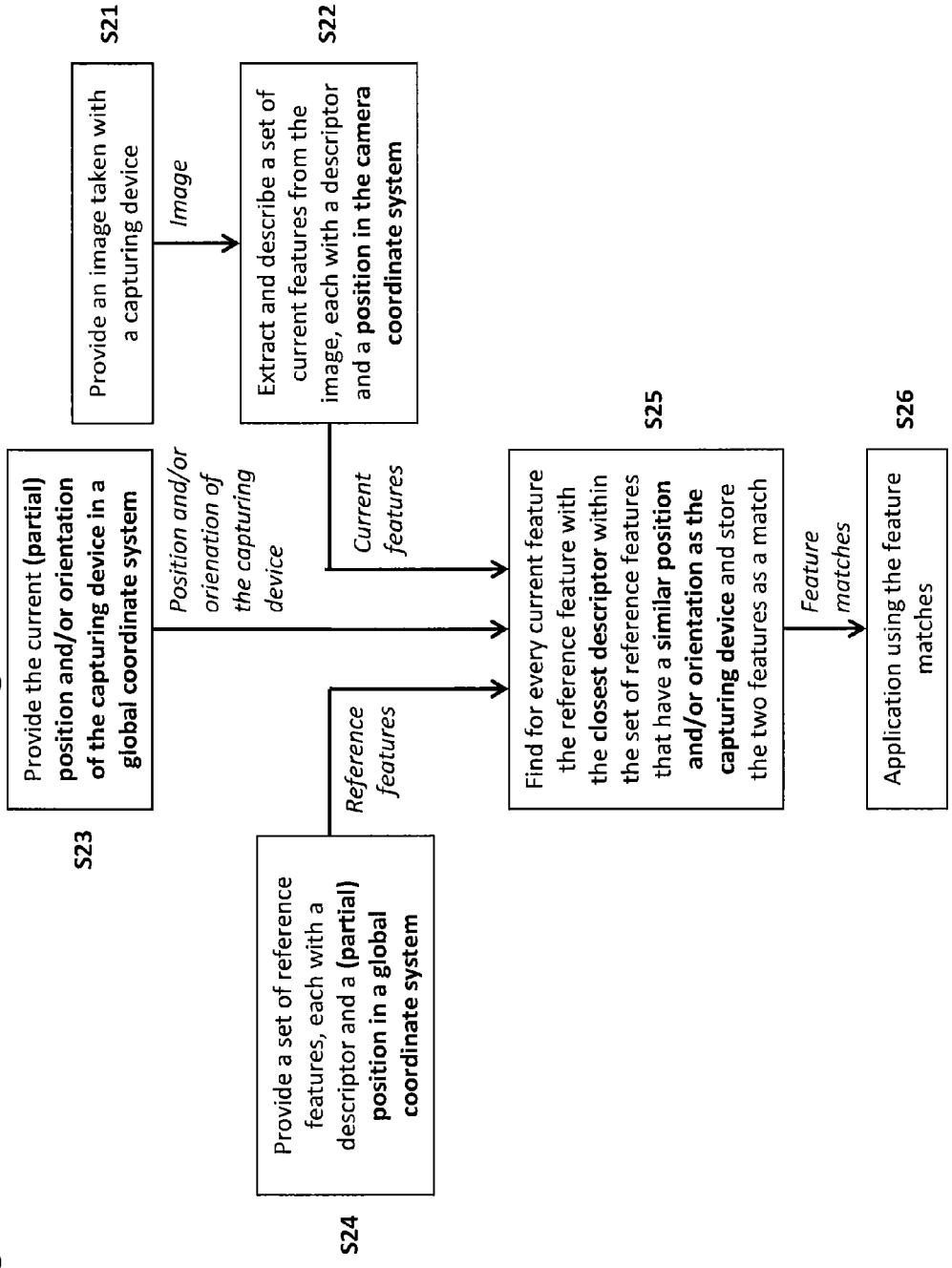
Figure 2: State-of-the-art, e.g. GPS-based methods [4]

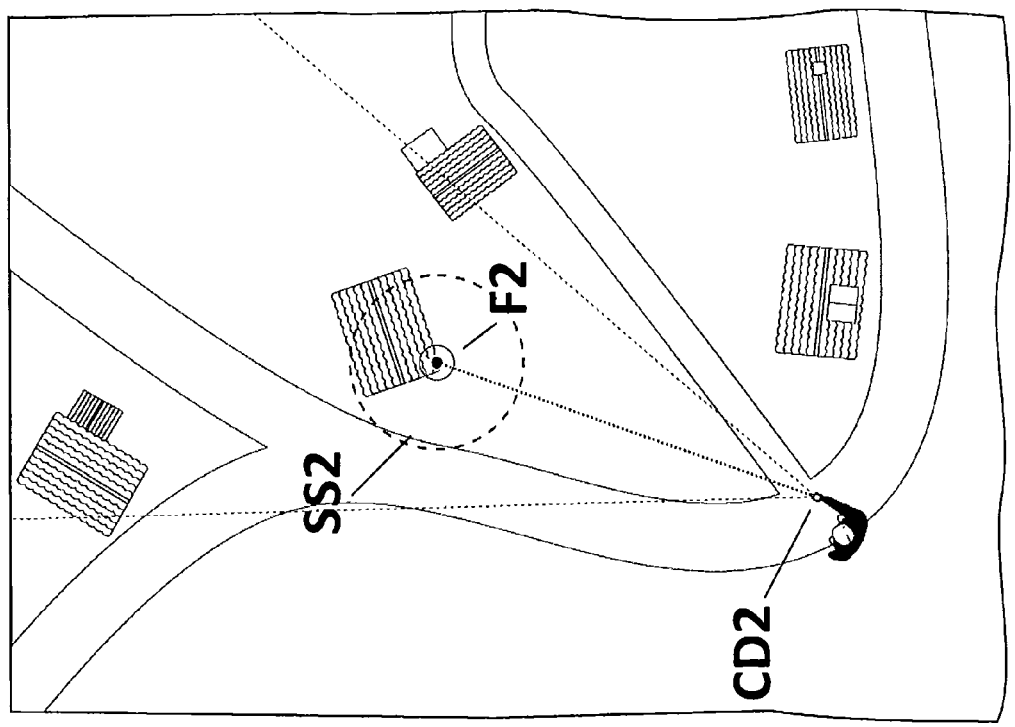
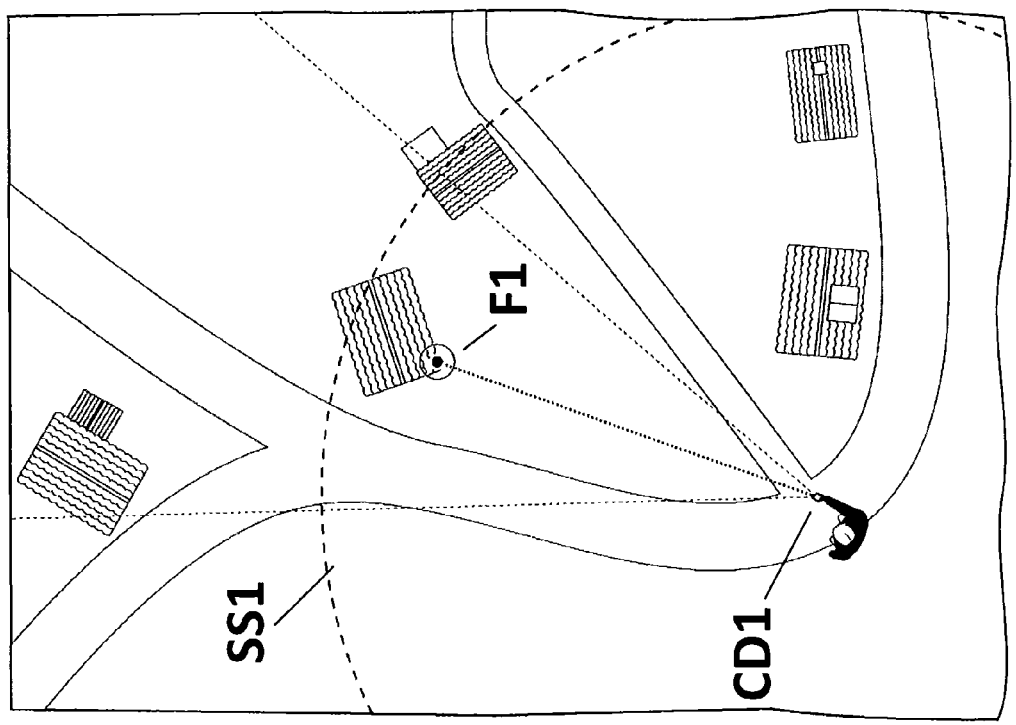
Figure 4

Figure 8: Exemplary embodiment in a client-server framework

Figure 9
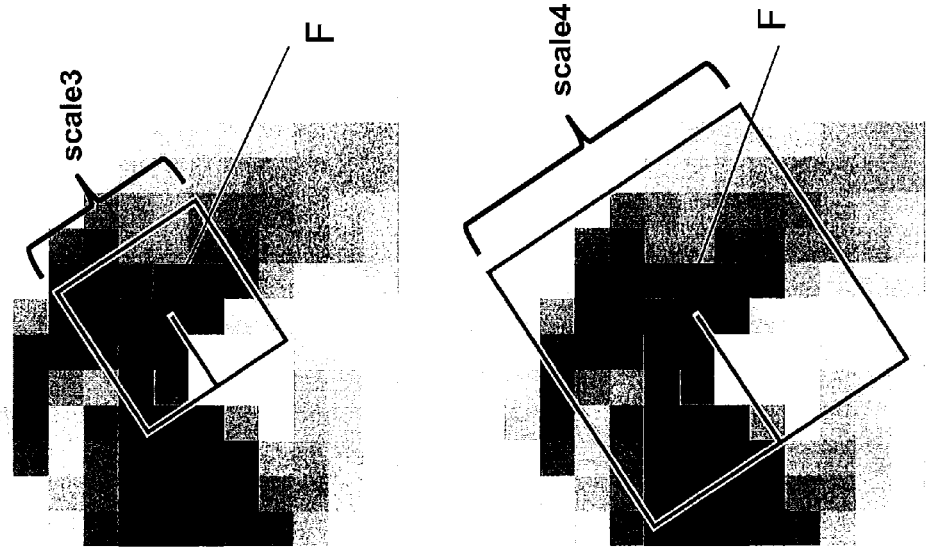
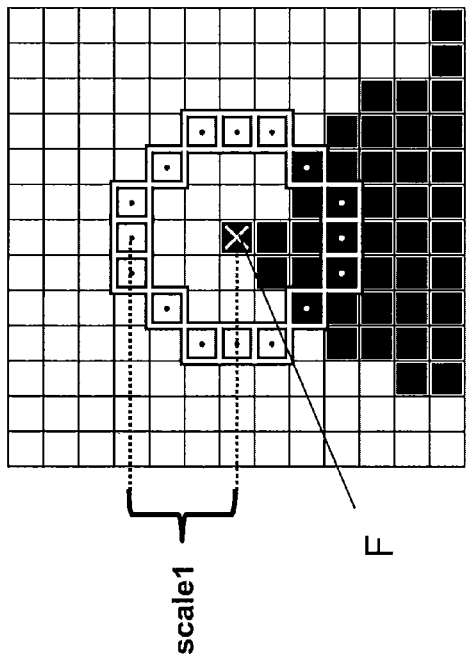
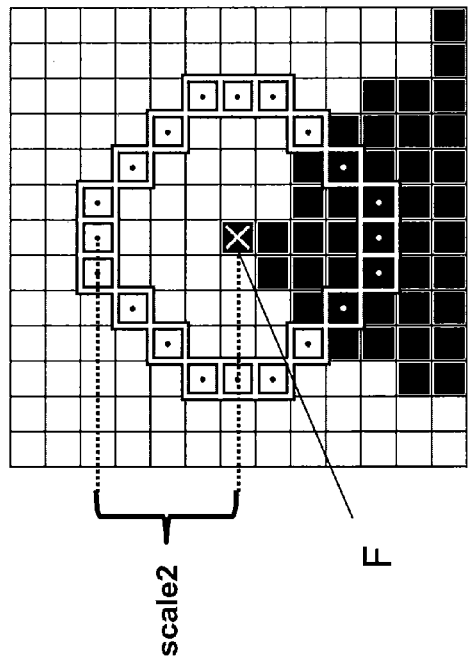
Example for the scale of a feature (detector), e.g. FAST
Example for the scale of a feature descriptor, e.g. SIFT

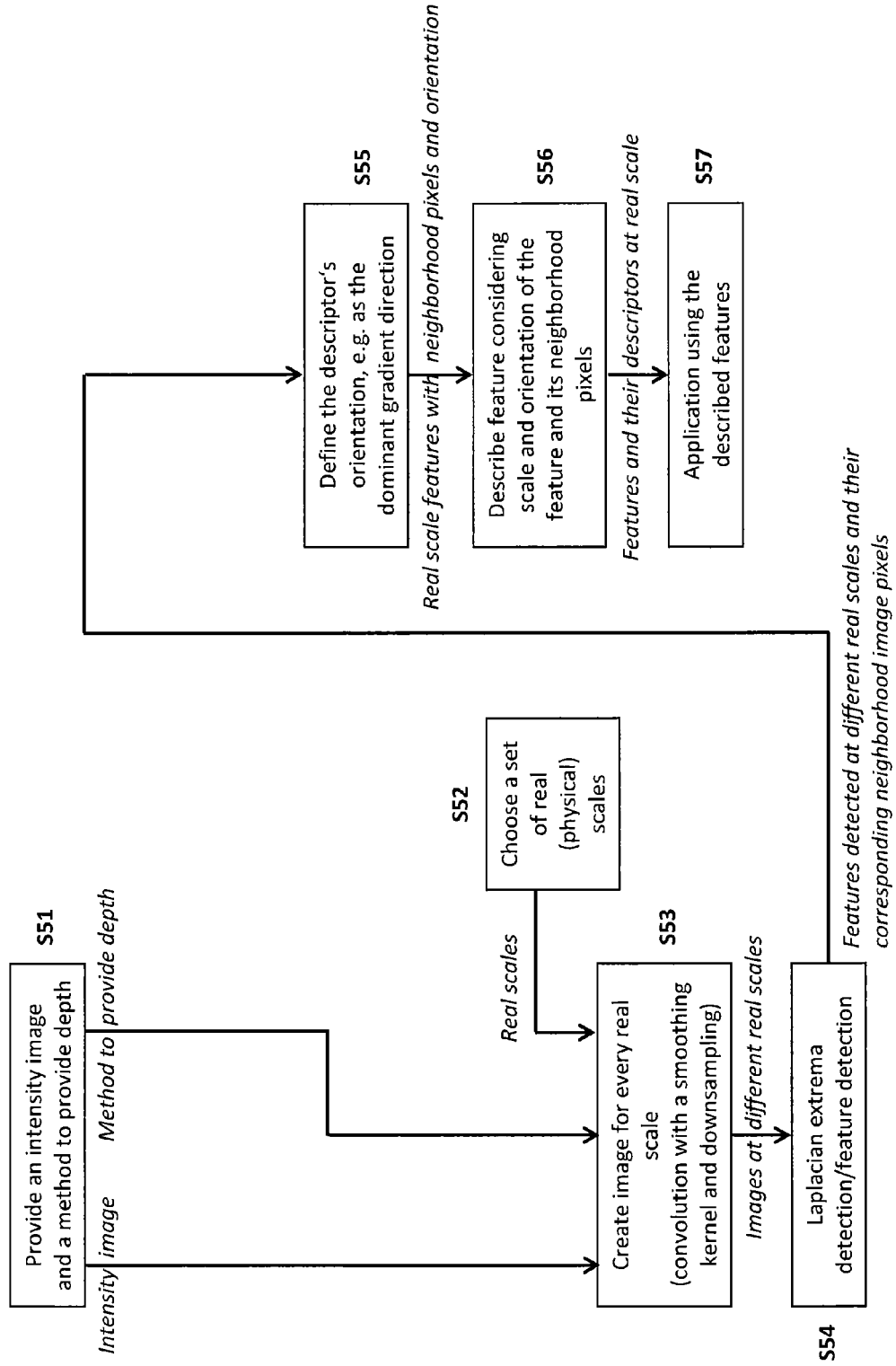

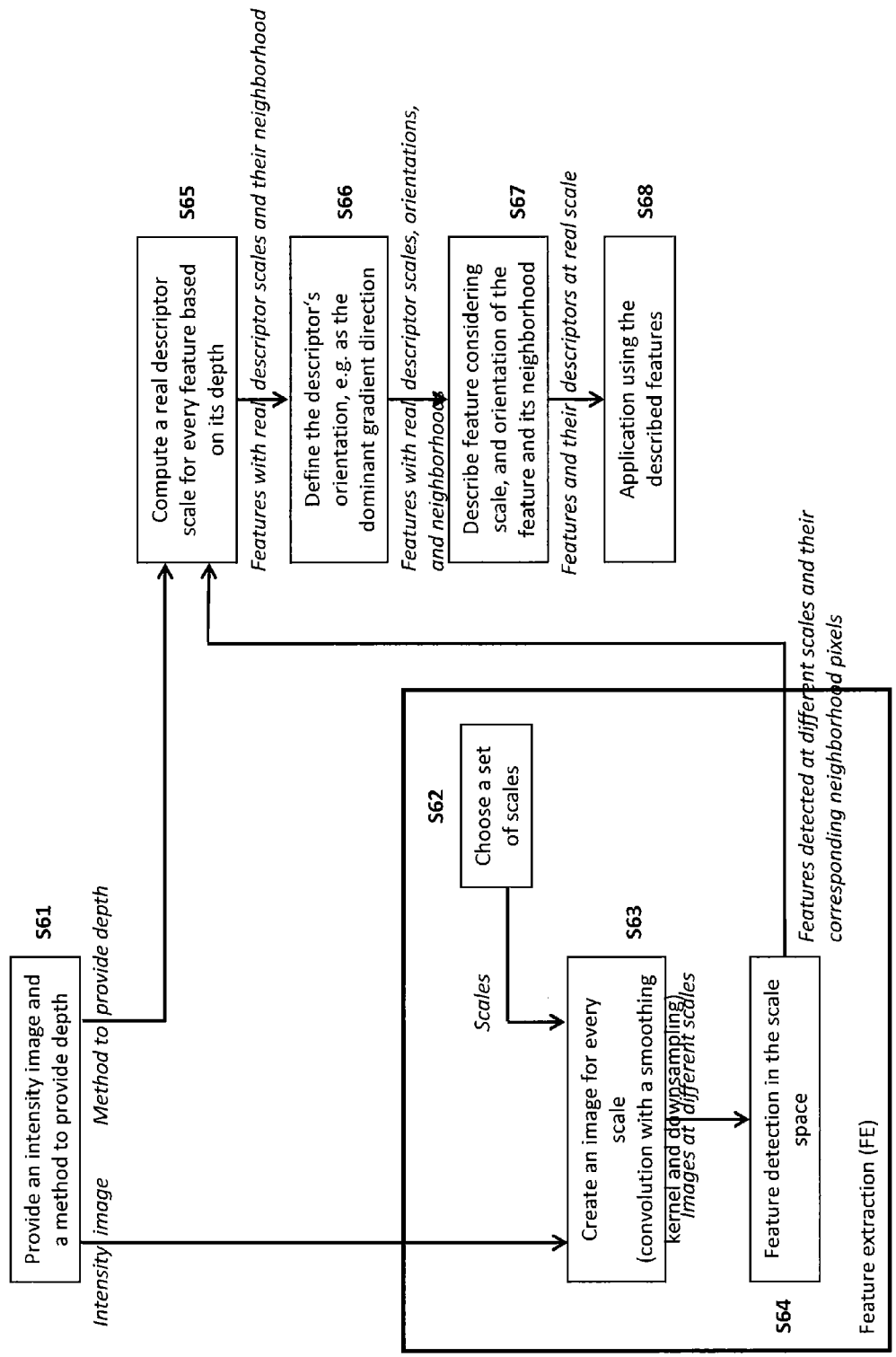
Figure 10b: Real scale feature description

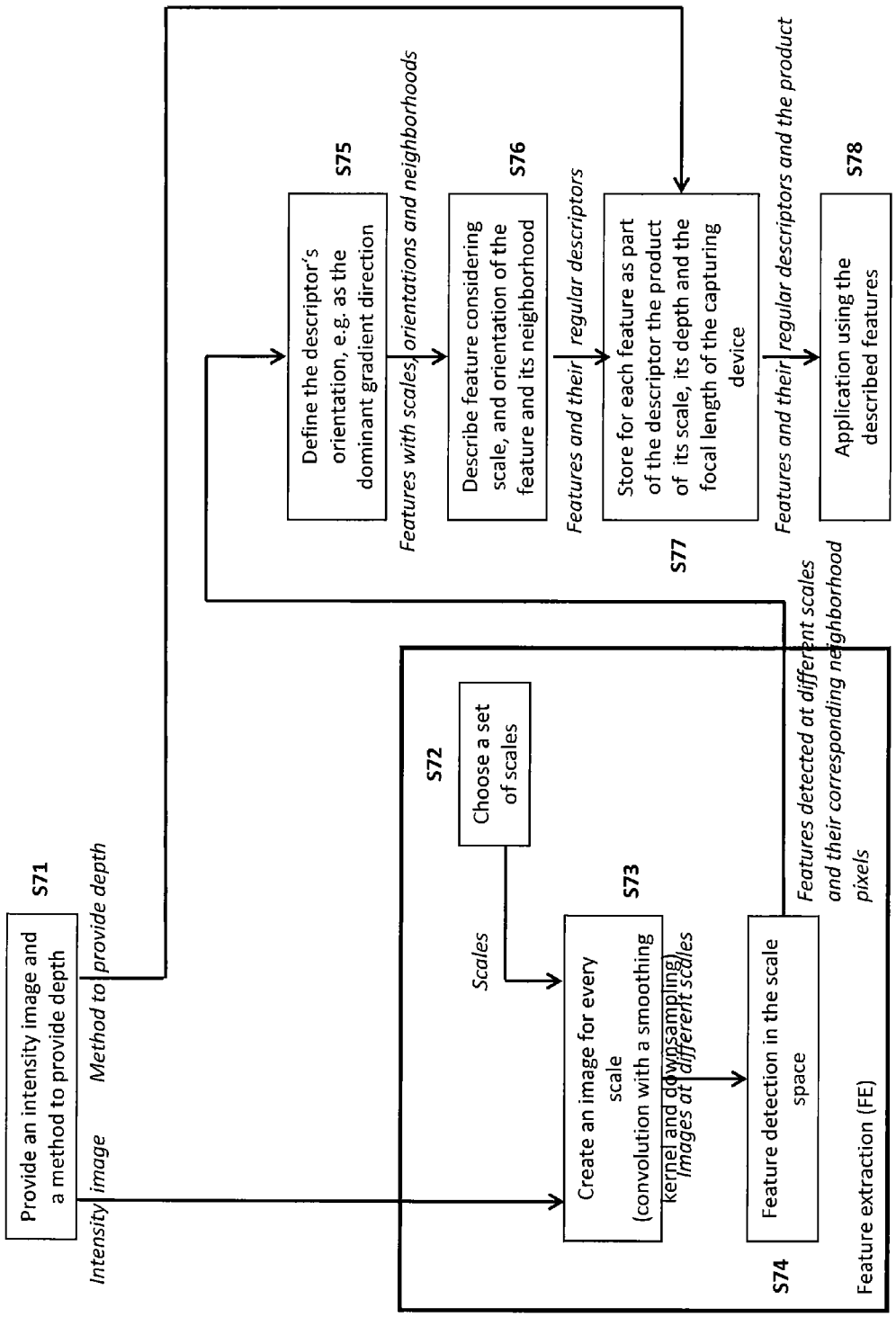
Figure 10c: Scale-invariant real-scale-aware feature description

METHOD OF MATCHING IMAGE FEATURES WITH REFERENCE FEATURES

This application is entitled to the benefit of, and incorporates by reference essential subject matter disclosed in PCT Application No. PCT/EP2011/065002 filed on Aug. 31, 2011.

BACKGROUND OF THE INVENTION

1. Technical Field

The present invention is directed to a method of matching image features with reference features, comprising the steps of providing a current image captured by a capturing device, providing reference features, detecting at least one feature in the current image in a feature detection process, and matching the detected feature with at least one of the reference features.

2. Background Information

Many tasks in processing of images taken by a camera, such as in augmented reality applications and computer vision require finding points or features in multiple images of the same object or scene that correspond to the same physical 3D surface. A common approach, e.g. as in SIFT disclosed in David G. Lowe. Distinctive Image Features from Scale-Invariant Keypoints. Int. J. Comput. Vision 60, 2 (November 2004), 91-110, 2004 ("Lowe"), is to first detect features in an image with a method that has a high repeatability. This means that the probability is high that the part in an image corresponding to the same physical 3D surface is chosen as feature for different viewpoints, different rotations and illumination settings. Features are usually extracted in scale space, i.e. at different scales. Therefore, each feature has a repeatable scale in addition to its two-dimensional position. In addition, a repeatable orientation (rotation) is computed from the intensities of the pixels in a region around the feature, e.g. as the dominant direction of intensity gradients.

Finally, to enable comparison and matching of features, a feature descriptor is needed. Common approaches use the computed scale and orientation of the feature to transform the coordinates of the feature descriptor, which provides invariance to rotation and scale. The descriptor is for instance an n-dimensional real-numbered vector, which is usually constructed by concatenating histograms of functions of local image intensities, such as gradients as disclosed in Lowe.

Given a current feature, detected in and described from a current intensity image, an important task is to find a feature that corresponds to the same physical surface in a set of provided features that will be referred to as reference features. A naïve approach would find the nearest neighbor of the current feature's descriptor by means of exhaustive search and choose the corresponding reference feature as match. More advanced approaches employ spatial data structures in the descriptor domain to speed up matching. Unfortunately, there is no known method that would enable nearest neighbor search in high-dimensional spaces, which is significantly faster than exhaustive search. That is why common approaches use approximate nearest neighbor search instead, e.g. enabled by space partitioning data structures such as kd-trees as disclosed in Lowe.

Limitations of the Standard Approaches:

With an increasing number of reference features, the time to match a single current feature goes up, making real-time processing impossible at some point. Also, the distinctiveness of feature descriptors decreases with the overall number of reference features. While the first problem can be addressed with optimized data structures enabling fast approximate nearest neighbor search up to a certain extent, the second problem cannot be solved without incorporating any further information.

Already Proposed Solutions:

Gerhard Reitmayr and Tom W. Drummond. Initialisation for Visual Tracking in Urban Environments. In Proceedings of the 2007 6th IEEE and ACM International Symposium on Mixed and Augmented Reality (ISMAR '07). IEEE Computer Society, Washington, D.C., USA, 1-9, 2007 ("Reitmayr") describe an outdoor Augmented Reality system that relies on visual tracking. To initialize the visual tracking, i.e. to find the position and orientation of the camera with respect to the world without any knowledge from a prior frame, they use GPS to gain a coarse position of the device. Given this position, they try to initialize visual tracking with a constrained camera position at a number of position samples around the rough GPS measure until initialization succeeds.

Gerhard Schall, Daniel Wagner, Gerhard Reitmayr, Elise Taichmann, Manfred Wieser, Dieter Schmalstieg, and Bernhard Hofmann-Wellenhof. Global pose estimation using multi-sensor fusion for outdoor Augmented Reality. In Proceedings of the 2009 8th IEEE International Symposium on Mixed and Augmented Reality, 2009 ("Schall") combine a differential GPS/IMU hardware module with barometric height measurements in a Kalman filter to improve the accuracy of the user's 3D position estimate. This filtered inertial tracking is again combined with a drift-free visual panorama tracker that allows for online learning of natural features. The method does not use any (offline learned) reference features.

Different approaches exist that are based on a set of geo-referenced local image features acting as reference features. The assumption of these approaches is that if the position of the capturing device is approximately known, e.g. by GPS, only those reference features are possibly visible that are located in the vicinity of the capturing device. Some examples of this class of approaches are described in the following.

A. Kumar, J.-P. Tardif, R. Anati, and K. Daniilidis. Experiments on visual loop closing using vocabulary trees. In Computer Vision and Pattern Recognition (CVPR) Workshops, June 2008. Anchorage, Ak. ("Kumar") use GPS positioning to narrow down the search area to the vicinity of the capturing device and use a set of pre-built vocabulary trees to find the best matching image in this search area.

Similarly, D. Chen, G. Baatz, K. Koeser, S. Tsai, R. Vedantham, T. Pylvanainen, K. Roimela, X. Chen, J. Bach, M. Pollefeys, B. Girod, and R. Grzeszczuk. City-scale landmark identification on mobile devices. IEEE International Conference on Computer Vision and Pattern Recognition (CVPR), June 2011 ("Chen") use priors on the device position by GPS to improve feature matching. They discuss both using one small vocabulary tree for every spatial region as disclosed in Kumarand compare this with an approach using one global vocabulary tree and incorporating the GPS position as a prior in the feature match scoring process. They come to the conclusion that the second approach would provide better results.

Clemens Arth, Daniel Wagner, Manfred Klopschitz, Arnold Irschara, and Dieter Schmalstieg. Wide area localization on mobile phones. In Proceedings of the 2009 8th IEEE International Symposium on Mixed and Augmented Reality (ISMAR '09). IEEE Computer Society, Washington, D.C., USA, 73-82, 2009 ("Arth") use potentially visible sets (PVS) and thereby not only consider spatial vicinity of features but also visibility constraints. Even though they do not use GPS in their indoor experiments, they explain how GPS could be used in outdoor applications to determine the rough position of the capturing device which could then be used to retrieve the potentially visible sets of reference features for this position.

Gabriele Bleser and Didier Stricker. Advanced tracking through efficient image processing and visual-inertial sensor fusion. Computer & Graphics, Vol. 33, Pages 59-72, Elsevier, New York, 2/2009 present a visual inertial tracking method that applies inertial sensors to measure the relative movement of the camera from the prior frame to the current frame. This knowledge is used to predict the position and therefore define a 2D search space in the image space for features that are tracked from frame to frame. As they use measurements of relative camera transformations only, their technique is not suited for the initialization of camera pose tracking.

While Schalldoes not use any reference feature or any model of the environment, the method described in Reitmayr-does, but does not limit the search space of reference features based on the measured GPS position. However, Kumar, Chen, and Arthdo so. Based on the position of the capturing device, they decide which reference features might be visible and which are most likely not. This decision is taken on a per-image-level, meaning the same subset of reference features is considered a possible match for all current features in a current camera image.

Modern handheld devices provide much more sensor data than the device position. For instance, digital compasses measure the orientation of the device with respect to north and inertial sensors provide the device orientation with respect to gravity. Also the 2D position of a feature in the camera image, and its depth, if available, contain useful information in some applications.

As set out above, known prior art approaches narrow the search space to features in the vicinity of the capturing device and thereby avoid matches with far away features. However, in particular in urban environments, it is often the case that similar looking features, which tend to cause mismatches, are located close to each other and may be both visible at the same time. Examples include the windows of a building façade which usually all look very similar. It is obviously likely to have many similar looking windows visible in the camera image at the same time. This makes any global approach, i.e. narrowing search space on a per-image-level, as set out above, unsuitable to prevent mismatches.

It is an object of the present invention to provide a method of matching image features with reference features which is capable of improving real-time processing while maintaining the distinctiveness of feature descriptors even with an increasing overall number of reference features.

SUMMARY OF THE INVENTION

According to an aspect of the invention, there is provided a method of matching image features with reference features, comprising the steps of providing a current image captured by a capturing device, providing a set of reference features, wherein each of the reference features comprises at least one first parameter which is at least partially indicative of a position and/or orientation of the reference feature with respect to a global coordinate system, or which is at least partially indicative of a position of the reference feature with respect to an altitude, detecting at least one feature in the current image in a feature detection process, associating with the detected feature at least one second parameter which is at least partially indicative of a position and/or orientation of the detected feature with respect to the global coordinate system, or which is at least partially indicative of a position of the detected feature with respect to an altitude, and matching the detected feature with at least one of the reference features of the set of reference features by determining a similarity measure between the at least one first parameter and the at least one second parameter. Particularly, the global coordinate system may be an earth coordinate system or an object coordinate system, for example of a building or a product.

According to an embodiment, the method includes the step of defining a search space with a reduced number of reference features within the set of reference features when matching the detected feature, wherein the search space is determined based on the at least one second parameter.

Thus, according to aspects of the invention, it is proposed to narrow the search space for matching local image features by considering the at least partial knowledge of their position in coordinates of a global coordinate system (world coordinates). Given a current feature in a current image, the method is looking for a corresponding feature in a set of reference features with (partially known) world coordinates. More particularly, depending on the available information on the position and/or orientation of the capturing device at the time the current image was taken, and the possibly available depth of particular pixels of the current image, the (partial) position of a current feature in world coordinates can be determined. This is then used to narrow the search space by only considering those reference features as possible matches that are located closely to the (partial) position of the current feature in world coordinates. The resulting matches can for instance be used to initialize a visual camera tracking method in an Augmented Reality application.

As set out above, the methods according to Kumar, Chen, and Arthdecide based on the position of the capturing device which reference features might be visible and which are most likely not. This decision is taken on a per-image-level, meaning that the same subset of reference features is considered as a possible match for all current features in a current camera image. The approach according to the present invention differs from these approaches as it associates with the detected feature of a camera image an at least partial position and/or orientation information of the detected feature with respect to the global coordinate system, and takes this decision on a per-feature-level. The set of possibly matching reference features is determined for every detected feature in the current camera image based on its (partially) known global position.

According to an embodiment, the global coordinate system provides information about a geo-referenced position and/or orientation of a feature. For example, at least one of the at least one first and second parameters is at least partially indicative of a longitude and latitude.

According to an embodiment, at least one of the at least one first and second parameters is at least partially indicative of a position with respect to a relative altitude relative to the capturing device, or an absolute altitude.

According to an embodiment, the position and/or orientation of the detected feature is described by an equation that describes a geometric shape, for example a point, a ray, a straight line, a circle, a cone, or a cylinder. For example, the step of matching the detected feature with the set of reference features then only considers those reference features of the set of reference features as possible matches that have a position whose distance to the geometric shape is below a threshold.

According to an embodiment, at least one of the at least one first and second parameters is part of a spatial data structure in a feature descriptor domain and/or in a spatial domain, for example wherein the spatial data structure includes a bounding volume, such as axis-aligned boxes, oriented boxes, spheres, arbitrary volumes, or a grid, or any kind of tree, such as Quadtrees, Octrees, BSP-trees, kd-trees, R-trees.

Preferably, the at least one second parameter is determined using an at least partial position and/or orientation of the capturing device with respect to the global coordinate system when capturing the current image.

According to an embodiment of the invention, the at least one first parameter may be at least partially indicative of a position only and/or at least partially indicative of a position and orientation of the reference feature with respect to the global coordinate system. Similarly, according to an embodiment of the invention, the at least one second parameter is at least partially indicative of a position or at least partially indicative of a position and orientation of the detected feature with respect to the global coordinate system. In these embodiments, the orientation of the detected feature may not be taken into account by the method.

If depth information of an element of a detected feature is available, the at least one second parameter may be determined using a depth of at least one element in the current image being a part of the detected feature.

According to an embodiment, the at least one second parameter is determined using a measurement of a gravity vector in a coordinate system associated to the capturing device and a depth of at least one element in the current image being a part of the detected feature. For example, the position of the detected feature is at least partially described by a plane having a normal being or corresponding to the gravity vector, with the plane indicative of the altitude.

According to an embodiment, the at least one second parameter is determined by further using a set of intrinsic parameters of the capturing device, and a position of the detected feature in the current image.

A 3-dimensional position of the detected feature with respect to the global coordinate system or a coordinate system of the capturing device may be calculated by combining a determined distance of the detected feature towards the capturing device and the orientation of the capturing device.

According to an embodiment, the set of reference features is taken from at least one reference image which has been recorded with a second capturing device different from the capturing device. For example, the capture time of the at least one reference image is at least one day older than the capture time of the current image.

According to an embodiment, the method further comprises the step of providing at least a partial position, orientation and/or altitude of the capturing device, wherein based thereon an uncertainty information associated with the at least one second parameter of the detected feature is derived.

According to an embodiment, the uncertainty information is used to influence the matching process. For example, the uncertainty information influences the matching process by changing a respective weight of at least one of individual degrees of freedom regarding the position and/or orientation depending on the uncertainty (e.g. x, y, z in Cartesian coordinates).

According to another embodiment, the uncertainty information may influence the selection of reference features as matching candidates to be matched. For example, the method further comprises providing a weight based on which the selection of reference features as matching candidates is influenced, wherein a higher uncertainty decreases the weight and a lower uncertainty increases the weight.

For instance, the uncertainty information is determined based on a type of sensor for providing the position, orientation and/or altitude of the capturing device.

According to an embodiment, the method further includes the step of using a matching result for detection, classification, or localization of an object in the current image, or for localization of the capturing device in the global coordinate system, or for initial pose estimation of the capturing device, or for initializing pose tracking of the capturing device.

In a possible implementation, the method is used in an augmented reality application.

The invention is also concerned with a computer program product adapted to be loaded into the internal memory of a digital computer and comprising software code sections by means of which the method according to the invention is performed when said product is running on said computer.

BRIEF DESCRIPTION OF THE DRAWINGS

Further aspects and embodiments of the invention will now be described in more detail by referring to the following Figures in which:

FIG. 1A shows a flow chart of a standard method to match a set of current features with a set of reference features.

FIG. 1B is a depiction for illustrating detection, description and matching of features.

FIG. 2 explains state-of-the-art approaches to feature matching that incorporate a coarse prior of the device position, e.g. provided by GPS, in a flow chart.

FIG. 4 is an illustration which shows a comparison of an embodiment of the present invention with a state-of-art approach.

FIG. 9 illustrates a scale or size of a feature in respect to a FAST corner detector and a SIFT feature descriptor, as common examples for a method to detect point features.

FIG. 10$a$ shows a flow diagram of a method according to an embodiment of the invention.

FIG. 10$b$ shows a flow diagram of a method according to another embodiment of the invention.

FIG. 10$c$ shows a flow diagram of a method according to another embodiment of the invention.

DETAILED DESCRIPTION OF THE INVENTION

Figure 1C:
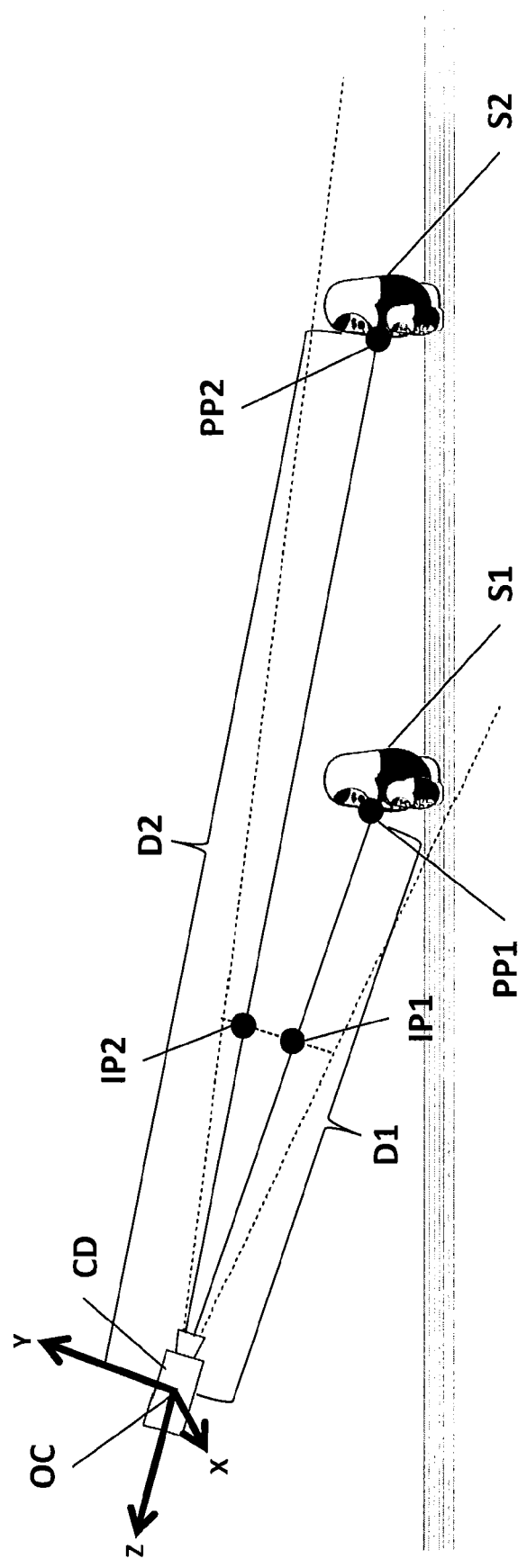
FIG. 1C shows an exemplary scene consisting of two sets of dolls and a capturing device capturing an image thereof for illustrating depth of a feature.

The following description of aspects of the invention shall be understood by the skilled person as referring only to embodiments for explaining and illustrating principles and aspects of the invention without limiting the scope of the invention as defined in the appended claims.

In the following, terms like "global coordinate system", "world coordinate system", "global coordinates" and "world coordinates" are used interchangeably and are used to refer to a global coordinate system and its coordinates as described above.

Suppose there is provided a set of geo-referenced local image features where every feature has in addition to a feature descriptor an associated property describing its (partial) position and/or orientation in a global coordinate system. We will refer to such set of features as reference features. The acquisition of reference images, detection and description of reference features from the reference images and the determination of their (partial) position and/or orientation can be performed with any method and shall not be further described for reasons of brevity. Further, methods exist that are capable of at least partially determining a position of reference features with respect to an altitude, e.g. by using a barometer as a sensor device when capturing a reference image. The skilled person is well aware of such methods which are capable of providing such reference features.

A feature, in this sense, is a salient element in an image which can be a point, a line, a curve, a connected region or any other set of pixels. A feature descriptor refers to a method to provide a distinct description, e.g. in the form of a real-numbered vector, of a feature based on its local neighborhood in one or multiple images.

Any parameters associated with a (partial) position and/or orientation in a global coordinate system and/or altitude (as described in more detail below) of a feature may be stored as a part of a respective feature descriptor, or may be stored in addition to the respective feature descriptor. In which way to associate this information with a respective feature may be chosen as is appropriate.

Using a capturing device, such as a camera, a current image is captured and at least one current feature in it is detected and described. For every current feature, it is aimed to find a feature corresponding to the same physical surface in the set of reference features.

FIG. 1A shows a flow chart of a standard method to match a set of current features with a set of reference features in connection with FIG. 1B. In step S11, a current image CI is provided taken with a capturing device. The next step S12 then detects and describes features in the current image CI (optional: already selective extraction according to estimated model-feature-positions), where every resulting current feature CF has a feature descriptor D(CF) and a 2D position in the camera image CI. Possible methods that could be used for feature detection and description are explained in more detail below referring to exemplary implementations.

A set of reference features RF, each with a descriptor D(RF) and a (partial) position and/or orientation in a global coordinate system is provided in step S13. In step S14, the current features CF from step S12 and the reference features RF from step S13 are matched. For example, for every current feature the reference feature is searched that has the closest descriptor to the descriptor of the current feature with respect to a certain distance measure.

According to step S15, an application uses the feature matches, e.g. in order to estimate the position and orientation of the capturing device very accurately in an augmented reality application that integrates spatially registered virtual 3D objects into the camera image.

As will be set out in more detail below, a depth of an element, e.g. a pixel, in an image may be used as further information when matching features. Generally, the depth of an element in an image (e.g. pixel) may be defined as referring to the distance between the physical surface that is imaged in this element (pixel) and the capturing device, particularly the optical center of the capturing device.

In this regard, FIG. 1C shows an exemplary scene consisting of two sets of dolls S1 and S2 (each set comprising a tall and a small doll), and a capturing device CD. A physical point PP1 of the set S1 is imaged in the pixel IP1 with the capturing device. The depth of this pixel is D1, the distance between the optical center OC of the capturing device, which defines the origin of the camera coordinate system, and the physical point PP1. Analogously, a second physical point PP2 of the set S2 is imaged in IP2 and has the depth D2. Note that an estimate of the camera intrinsic parameters (in particular focal length) allows for computing the 3D position in Cartesian coordinates of a point PP1 given its depth D1 and its pixel position on the image plane IP1.

There are several methods possible to provide depth of an element, e.g. a pixel, in an image which may be used in a matching process according to the present invention which will be described in the following paragraphs.

Depth from Calibrated Cameras:

According to an embodiment to determine a depth of at least one element in an intensity image, at least two capturing devices with known relative position and/or orientation each capture a respective intensity image, wherein correspondences are found in the images and the relative position and/or orientation of the capturing devices is used to calculate a depth of at least one element in the intensity images which is part of at least one of the correspondences.

Particularly, one possibility to provide depth data is as follows: At least two cameras, recording intensities with known relative pose and ideally known intrinsic parameters, can capture images at approximately the same time or, when not moving, at different times. Correspondences can be found in both images and the relative pose and intrinsic of the cameras can be used to calculate the correspondences depth in either image coordinate system. It is advantageous to retrieve the relative pose and intrinsic parameters before trying to find correspondences, because they can be used to simplify the creation of correspondences through introducing additional constrains (e.g. epipolar geometry).

For example, the finding of correspondences based on point features can be implemented as follows: To match a 2D feature from one image to another, the patch around the 2D feature of specified size is searched in the other image. For instance, the sum-of-square-differences (SSD) or the normalized cross-correlation (NCC) can be used as distance or similarity measure, respectively. To reduce the number of comparisons needed to search the corresponding patch, it is only searched along the epipolar line of the feature point in the other image. To simplify the search along the epipolar line to a 1D-search, the images are first rectified. The two patches with the highest similarity are set into relation. If the one with the highest similarity is significantly more similar than the second highest similarity, the former one will be considered as matching correspondence.

Of course, to the expert it is clear, that many possibilities exist to gain correspondences. It is also possible to gain correspondences without taking into account the epipolar-lines. Of course, the process can also be implemented in an iterative fashion, using initial depth estimations to work with our proposed real scale feature descriptors and recalculate the correspondences and positions of the features with higher accuracy. Depth from at least one moving camera:

According to another embodiment to determine a depth of at least one element in an intensity image, at least one capturing device captures intensity images at different points of time from different positions, wherein correspondences are found in the different images and a relative position and/or orientation of the capturing device between the different images and a structure of the correspondences are recovered and used to calculate a depth of at least one element in the intensity images which is part of at least one of the correspondences.

For example, at least one camera takes images at different points of time from different positions. Ideally some additional sensor measurements are available (for example GPS positions). The images and additional information, if available, are then analyzed. Correspondences in the different images are found, for example by tracking features from image to image or by detecting local features and using scale invariant descriptors to match them. Then, a so called structure from motion (SfM) approach is used to recover the relative poses between the different images and the structure of the correspondences. There are many different approaches known to the skilled person. Ideally additional sensor data, like GPS positions or known movement of the camera (e.g. in a car by measuring the car's movement) can be used to give the structure of the correspondences a physical scale. Alternatively if in any image a known object, with known size can be retrieved (e.g. a dollar bill or a marker), physical scale can also be retrieved. In case physical scale cannot be retrieved, a scale is assumed and, our approach can still be used, but will only make sense for further matching in this exact scenario. For example in order to track camera movement in order to superimpose game-characters for a video game, the exact size of the movements might not matter, but realistic relative movements are important. Increased matches through real scale feature descriptors can help here.

Again, this process can be implemented in an iterative way, using initial scale estimations to refine the correspondences, leading to higher accuracy in pose estimations and structure.

Depth from Image Matching:

According to another embodiment to determine a depth of at least one element in an intensity image, there is provided at least one database of intensity images, wherein for each of the intensity images an overall depth, or depth for at least one image region, or depth for one or more pixels is known and the intensity image captured by the capturing device (current intensity image) is matched against this database. The matching result is used to calculate a depth of at least one element in the current intensity image.

For example, an approach to retrieve depth associated to an image is as follows: We assume a database of images exists and for each image either one overall depth (e.g. 10 m) or depth for individual image regions or depth for each pixel is known. The current image taken is now matched against this database. In order to speed up the process and/or to increase robustness, an optional step can be used to create an optimized data structure for image matching. This can for example be building a vocabulary tree or a KD-tree from the feature descriptors.

The method can try to register both images using the detailed depth information (if existing) from the database image and our proposed real scale feature descriptors or using other methods. If this is not possible or no detailed depth information is provided, the one given depth or the average depth is returned.

Depth from 3D Model Information and Sensor Information:

According to another embodiment to determine a depth of at least one element in an intensity image, there is provided an environment model and information about a position and/or orientation of the capturing device when capturing the intensity image with respect to the environment model (which may be an initial estimation), wherein the environment model and the information about the position and/or orientation of the capturing device are combined and used to calculate a depth of at least one element in the intensity image. For example, assuming an environment model can be provided, which can for example be a constructed 3D model or a scan of the environment. If any information is known about the position and/or orientation of the capturing device when the image was taken with respect to the environment model, both can be combined. For example, by rendering the 3D model with the assumed camera pose and camera intrinsic, the depth of every pixel can be obtained from the depth buffer provided by the environment model and used during rendering. Although an initial pose estimation is necessary for this approach, using the assumed depth and the present invention with a textured environment model, the pose can then be refined and become more accurate, among other applications. Of course this process might also be used iteratively.

Depth from Dedicated Sensors:

According to another embodiment to determine a depth of at least one element in an intensity image, there is provided at least one sensor for retrieving depth information or range data and at least a relative position and/or orientation of the at least one sensor with respect to the capturing device, wherein the depth information or range data is used to calculate a depth of at least one element in the intensity image. Preferably, the pose (position and orientation) and intrinsic parameters of, both, the sensor and the capturing device are known.

Particularly, a method to retrieve depth information is using special sensors, specialized on retrieving depth information or range data. That can for example be a time of flight mechanism, like a laser scanner or a time of flight camera. Another example are sensors, which project a known pattern of light into the environment and retrieve the pattern after it was reflected by the environment with a sensor. By matching the projected information and the received pattern and by knowing the pose of the projector towards the retrieving sensor and by knowing the intrinsic parameters of both projector and sensor, depth can be calculated.

Another sensor allowing the retrieval of depth data is a plenoptic camera (e.g., see D. V. Johnston, Learning Depth in Lightfield Images, CS229 Machine Learning Autumn 2005, Stanford University, 2005, http://www.stanford.edu/class/cs229/proj2005/Johnston-LearningDepthInLightfieldImages.pdf)

In order to use the depth-sensor's information with the intensity image, the pose and intrinsics of both are known. The depth information can then be transformed into the camera coordinate system and be used.

FIG. 2 explains a state-of-the-art approach to feature matching, e.g. a GPS-based method as described in Chen, that incorporates a coarse prior of the capturing device position, e.g. provided by GPS, in a flow chart. In step S21, a current image is provided, and features are detected and described in this image in step S22. The resulting set of current features has a descriptor and a 2D position in image coordinates for each feature. Step S23 provides a (partial) position and/or orientation of the capturing device in a global coordinate system. Together with a set of reference features provided in step S24, that have (partially) known coordinates in a global coordinate system, the (partial) position and/or orientation of the capturing device and the current features are used in the matching stage in step S25. Here, the (partial) knowledge of the capturing device position and/or orientation is used to narrow the search space of possibly visible reference features. For every current feature, the reference feature with the most similar descriptor is found in the set of reference features that have a position and/or orientation similar to the capturing device. Eventually, an application uses the matches of current and reference features in step S26. As in step S15 in FIG. 1A, this application can be, but is not limited to, an augmented reality application.

According to aspects of the present invention, it is proposed to narrow the search space for matching image features of a current image taken by a capturing device by considering the (partial) knowledge of their position in world coordinates (or global coordinates). A global coordinate system may be an earth coordinate system or an object coordinate system (e.g. a building or a product package or a car), which has a fixed altitude or a fixed orientation related to earth's gravity.

To narrow the search space, the method according to the present invention preferably uses all available information to at least partially describe the position and/or orientation of the current feature (i.e., not of the capturing device) in a global coordinate system. As the degrees of freedom of a feature's position that can be determined are heavily depending on the available information on the position and orientation of the capturing device, different exemplary implementations of aspects of the present invention are explained in the following in more detail.

Figure 3:
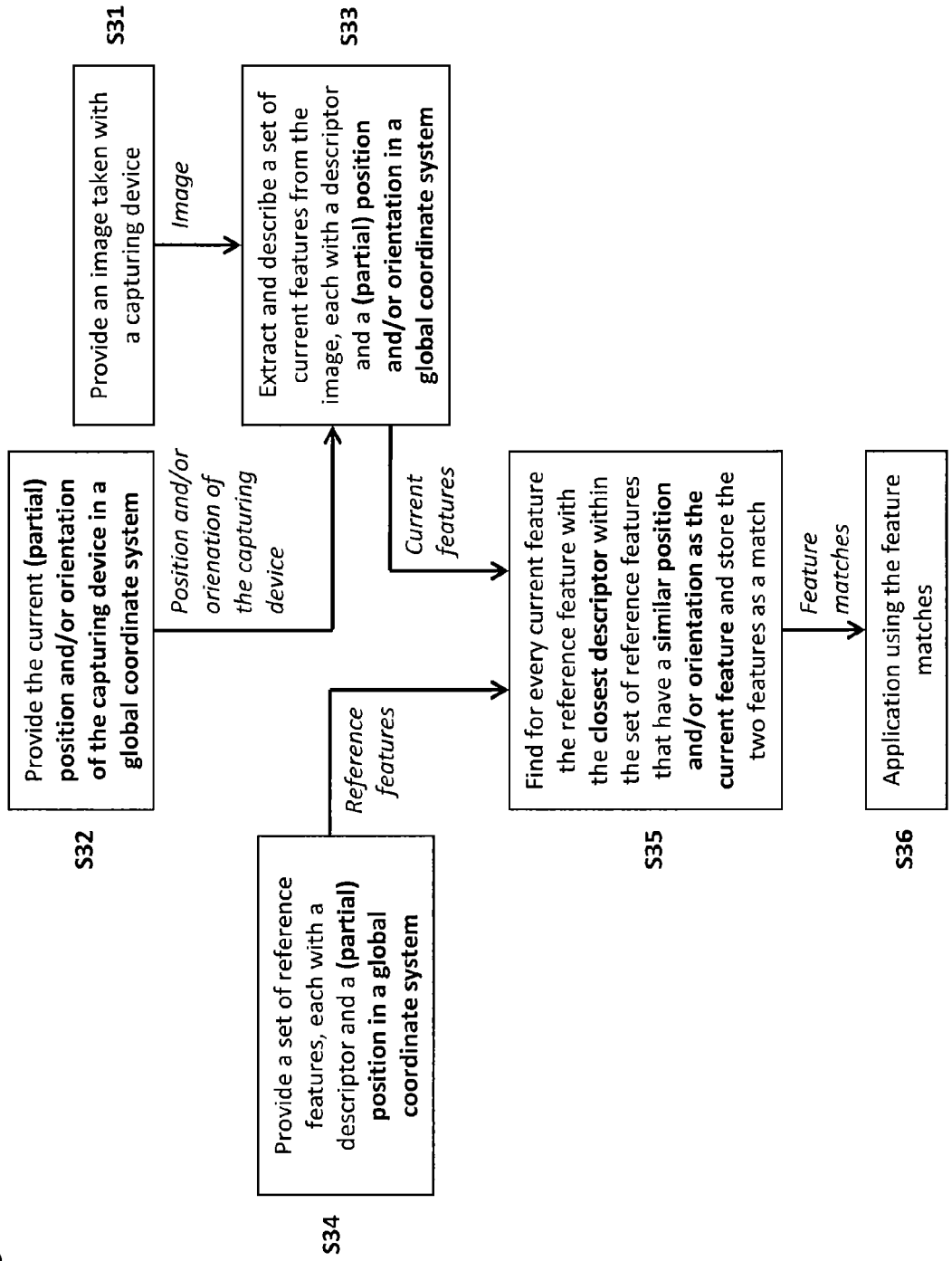
FIG. 3 shows a flow diagram of a method according to an embodiment of the invention.

FIG. 3 depicts a flow chart of a method according to an embodiment of the invention. In step S31, a current image taken with a capturing device is provided. The (partial) position and/or orientation of this capturing device in a global coordinate system is provided in step S32. Then, step S33 detects and describes features from the provided current image and computes the (partial) position and/or orientation in the global coordinate system of every current feature. A set of reference features each with a descriptor and a (partial) position and/or orientation in a global coordinate system is provided in step S34, wherein the reference features act as input to the matching in step S35 together with the current features. The proposed matching method (step S35) then finds for every current feature the matching reference feature by looking for the reference feature with the closest descriptor in the set of reference features that have a (partial) position and/or orientation in the global coordinate system close to the (partially) known position and/or orientation of the current feature in that global coordinate system. In the end, the feature matches are used in an application in step S36 which corresponds to steps S15 and S26 as described above.

The position of a current feature may be described by an equation E that describes a point, a ray, a straight line, a circle, a cone, a cylinder or any other geometric shape. The matching procedure then only considers those reference features as possible matches that have a position whose distance to the geometric shape defined by E is below a threshold epsilon. Thereby, epsilon is for instance depending on the determined accuracy of the sensor measures used to compute the current feature's partial position. Depending on the uncertainty of the individual sources of partial spatial information, the distance measure between the position of a reference feature and a current feature does not necessarily need to be the Euclidean distance, but might have different weights for different degrees of freedom. Also, it might be depending on the distance between a reference feature and the capturing device.

Details of uncertainty propagation can be found in, for example, in U.S. Pat. No. 7,768,534 B2.

Aspects of the present idea have some similarities to the concept of epipolar geometry. If the transformation between two cameras is known, the problem of finding corresponding features is simplified, as for every feature in the first image a straight line ("epipolar line") in the second image can be defined that contains the corresponding feature, if it is visible in that image at all. However, in one aspect the present approach differs in that it is much more universal and in that the approach uses constraints in 3D whereas epipolar geometry constraints are in the 2D image space. Another important difference is the reference coordinate system of the restricted matching process. For example, in epipolar geometry, everything is bound to the image space, while the present approach is based on the global coordinate system, making them independent of the relative camera pose.

Exemplary Implementations:

This section not only discusses different implementations of aspects of the invention depending on the available information, but also mentions exemplary implementations of the feature detection, feature description, and a method to match two feature sets given spatial constraints.

Methods to detect features in an image that could be used in a method of the invention include but are not limited to local extrema of Laplacian of Gaussian (LoG), Difference of Gaussians (DoG) or Determinant of Hessian (DoH), Maximally stable extremal regions (MSER), Harris features, or learning-based corner detectors such as FAST. Also methods that detect edges (edge elements) are suitable to be used in such method. The feature detection method to be used is not limited to approaches working on a 2D intensity grayscale image, but can also be performed on images in any other color space, including RGB, HSV, and Lab, or range images that either exclusively contain depth information or provide both depth and intensity information.

The method to describe features can work on any of the types of images explained above and may include SIFT (Scale-invariant feature transform), SURF (Speeded Up Robust Feature), GLOH (Gradient Location and Orientation Histogram), HOG (Histogram of Oriented Gradients), 2.5D-SIFT, or any other method to compare local features including classification-based methods like Random Ferns.

The most naïve approach to the matching procedure in our method is to perform exhaustive search and check for every combination of current and reference feature their spatial distance prior to considering it a possible match and computing the distance between the two descriptors. More elaborate implementations of the idea would use spatial data structures in the descriptor domain and/or the spatial domain to speed up matching. Suitable data structures include but are not limited to bounding volumes (axis-aligned boxes, oriented boxes, spheres, arbitrary volumes), grids (uniform or not), or any kind of trees (e.g. Quadtrees, Octrees, BSP-trees, kd-trees, R-trees). The role of reference and current features in the matching process is interchangeable, i.e. either a matching reference feature is searched for each current feature or vice versa. Also, it is not necessarily needed to find a match for every single feature in either one of the feature sets, but the matching process aims to find at least one match between a reference feature and a current feature.

The found feature matches can then be used for applications including object detection, object classification, object localization, and localization of the camera in the global coordinate system. The latter, also referred to as "self-localization", can for instance be performed by means of robust pose estimation methods such as for instance RANSAC, PROSAC or M-Estimators. Note that such methods require an estimate of the intrinsic camera parameters, in particular the focal length. Depending on the available information on the position and/or orientation of the capturing device and the depth of pixels, different possible implementations of the inventive idea arise. They differ in the spatial constraints to narrow search space of the position and/or orientation of reference features that are potential matches for a given current feature. Exemplary examples, that we consider particularly important, will be explained in detail in the following.

The approaches assume an estimate of the camera's intrinsic parameters to be available. This estimate can for instance result from a calibration procedure or a reasonable guess, e.g.

based on the camera resolution. Those approaches that are based on an indication of the position of the capturing device can be seen with two different implementations. The longitude and latitude of the device is provided based on measurements, e.g. GPS. Depending on the hardware used, there might be no altitude measurements available or they might be very inaccurate. If a measurement of the absolute altitude of the capturing device is available and can be considered sufficiently accurate, it is used. Otherwise an assumption is used, e.g. that the user is located at street level and holds the capturing device in his or her hand at an altitude of approximate 1.5 to 2 meters above street level. The altitude of a device can be measured independently from the longitude and latitude, e.g. by means of a barometer.

In the following, we will assume that a feature is a point (i.e. a feature point, keypoint or interest point). The invention can however be implemented in a similar way with any other kind of feature, for instance by treating the center of gravity of a feature as its position. Other features can be edges, edgelets or regions.

In the following, an embodiment of the invention is described using ray or point from device position and 3D device orientation as an exemplary implementation.

If the position of the capturing device in world coordinates is known (e.g. by means of GPS and optionally a barometer) as well as the 3D orientation (e.g. measured with a combination of inertial sensors and a digital compass), the method according to aspects of the invention uses this information together with intrinsic parameters of the camera and the position of a current feature in the current image to define a ray in world coordinates that this feature is located on. If in addition an estimate of the feature's depth is available, the method is able to compute the absolute 3D position of the current feature in world coordinates.

In the matching stage, only reference features are considered that are closer to the point or ray, the current feature is located on, than a threshold value (epsilon). Again, the distance measure between a reference feature and a point or ray can be defined in a way that incorporates one or more uncertainties of the individual degrees of freedom of the position and/or orientation. A suitable spatial data structure for this configuration in the domain of world coordinates would be a uniform grid. The 3DDDA algorithm would, for example, be applied to determine the relevant cells that a ray pierces. For each cell in the grid, any spatial data structure in the domain of the descriptor could be applied to store the reference features contained in that cell, e.g. a KD-tree.

FIG. 4 is an illustration which shows a comparison of an embodiment of the present invention with a state-of-art approach. Particularly, FIG. 4 compares aspects of the invention with state-of-art on a very coarse level. A top view of an urban area is shown where a user holds a capturing device CD (designated CD1 in the left depiction and CD2 in the right depiction) at a measured position, wherein the capturing device captures an image of an environment. In the captured image, a feature F is detected (designated F1 in the left depiction and F2 in the right depiction). State-of-the-art (left depiction) defines a search space SS1 for reference features that correspond to the current feature F based on the known position of the capturing device CD. The method according to aspects of the invention (right depiction) computes the (partial) position of the feature F and defines a different search space SS2 for reference features corresponding to F based on the (partially known) position of F. As can be seen in FIG. 4, search space SS2 is significantly smaller than search space SS1 according to the prior art approach. Thereby, the method according to the invention allows narrowing the search space further than the state of the art which results in less mismatches.

In the following, another embodiment of the invention is described using 1D feature altitude from a 2D gravity direction and 1D feature depth as an exemplary implementation. This embodiment or aspects of the invention described with reference to this embodiment may be used without or in combination with any of the aforementioned embodiments or aspects of the invention.

Provided with a measurement of the gravity vector in a coordinate system associated to the capturing device, e.g. with inertial sensors, and the depth of a current feature in the current camera image, e.g. by means of a depth-from-stereo method, the method according to aspects of the invention computes the relative or absolute altitude of this feature.

The 2D position of a feature in the image together with intrinsic camera parameters enable defining a 3D ray in a coordinate system associated to the capturing device. As in addition the depth of the feature may be known, the feature's 3D position in the camera-aligned coordinate system can be computed. The vector from the optical center of the capturing device to the 3D feature position is then projected onto the normalized gravity vector resulting in an altitude of the feature.

The method described above results in a relative altitude measure with respect to the capturing device. To compute the absolute altitude of the feature, the device's absolute altitude needs to be added. This can be either measured, e.g. via GPS or a barometer, or can be based on an assumption as explained above.

Figure 5:
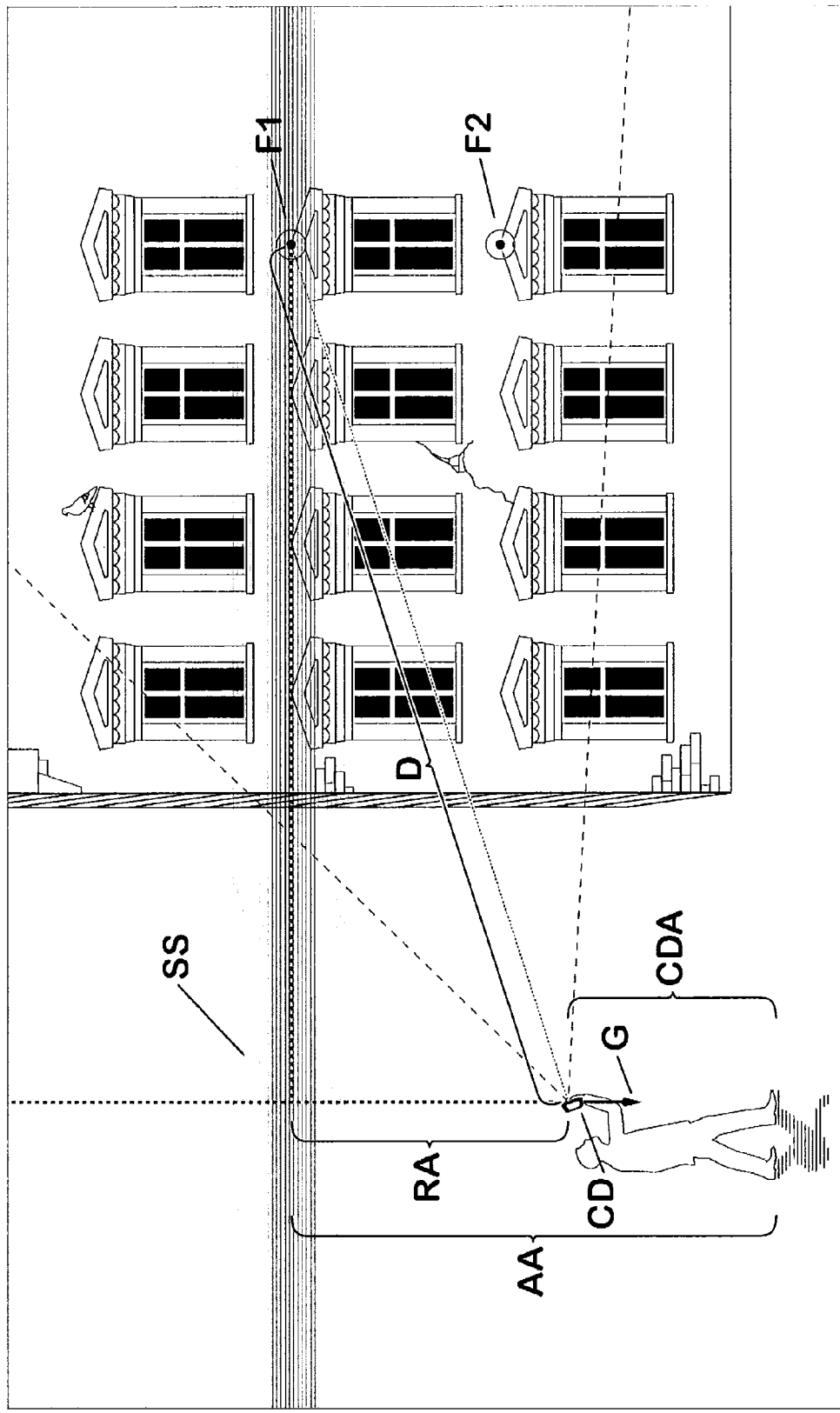
FIG. 5 shows an exemplary scene in which a method according to an embodiment of the invention is applied.

FIG. 5 illustrates a possible implementation of aspects of the invention as described above. Particularly, FIG. 5 shows a capturing device CD that provides a measurement of a gravity vector G in device coordinates (i.e. coordinates of the capturing device coordinate system) and the depth D of a feature F1. Given the two pieces of information, the relative altitude RA of the feature F1 with respect to the capturing device CD can be computed. Particularly, the 2D position of the feature F1 in the image together with intrinsic camera parameters enable defining a 3D ray in the coordinate system associated to the capturing device. As the depth D of the feature F1 is known, the feature's 3D position in the camera-aligned coordinate system can be computed. The vector from the optical center of the capturing device CD to the 3D feature position of feature F1 is then projected onto the normalized gravity vector resulting in the relative altitude RA of the feature F1. Adding the (absolute) altitude CDA of the capturing device CD results in the absolute altitude AA of the feature F1. Analogous calculations can be made for feature F2 to calculate its altitude.

The search space SS for a reference feature corresponding to the current feature F1 is then defined around its altitude AA. Note that in this way, the reference feature F2 is not considered as a possible match, even though it looks very similar to F1, because it does not fall into the search space SS. Thereby, the invention according to this aspect reduces the probability of mismatches.

According to an embodiment, in the matching stage, the position of a current feature is described by a plane with the normal being the gravity vector. The spatial constraint for reference features to be a candidate match for a current feature is that their distance to that plane is below a particular threshold. As the plane describes an altitude, the constraint can also be seen as forcing the absolute difference of altitudes of a reference and a current feature to be below that threshold.

A well-suited data structure for this implementation in the global coordinate system domain would be a non-uniform grid that has the majority of subdivisions along the gravity axis. Again, any data structure could be used to sort all features in a cell based on their descriptors.

Further Possible Implementations:

In the following, we will shortly describe a variety of possible implementations of aspects of the invention. According to an embodiment, the term "2D position" refers to the longitude and latitude of the capturing device, while "3D position" additionally includes the altitude. The term "1D rotation" refers to the orientation about the gravity, e.g. gained with a compass, "2D rotation" is the rotation with respect to gravity (e.g. measured with inertial sensors) and the "3D rotation" refers to a combination of both information.

One possible implementation of the invention would use the 2D position and the 3D rotation of the capturing device together with the position and depth of a current feature to define a vertical straight line in world coordinates that a corresponding reference feature needs to be approximately located on.

One other possible implementation of the invention would use the 2D position and the 3D rotation of the capturing device together with the position of a current feature to define a half plane in world coordinates that a corresponding reference feature needs to be approximately located on.

One other possible implementation of the invention would use the 3D position and the 1D rotation of the capturing device together with the position and depth of a current feature to define a semi-circle in world coordinates that a corresponding reference feature needs to be approximately located on.

One other possible implementation of the invention would use the 3D position and the 1D rotation of the capturing device together with the position of a current feature to define a halfplane in world coordinates that a corresponding reference feature needs to be approximately located on.

One other possible implementation of the invention would use the 2D position and the 1D rotation of the capturing device together with the position of a current feature to define a halfplane in world coordinates that a corresponding reference feature needs to be approximately located on.

One other possible implementation of the invention would use the 3D position and the 2D rotation of the capturing device together with the position and depth of a current feature to define a circle in world coordinates that a corresponding reference feature needs to be approximately located on.

One other possible implementation of the invention would use the 3D position and the 2D rotation of the capturing device together with the position of a current feature to define a cone in world coordinates that a corresponding reference feature needs to be approximately located on.

One other possible implementation of the invention would use the 2D position and the 2D rotation of the capturing device together with the position and depth of a current feature to define a cylinder in world coordinates that a corresponding reference feature needs to be approximately located on.

One other possible implementation of the invention would use the 1D position and the 2D rotation of the capturing device together with the position and depth of a current feature to define a plane in world coordinates that a corresponding reference feature needs to be approximately located on.

One other possible implementation of the invention would use the 3D position of the capturing device together with the position and depth of a current feature to define a sphere in world coordinates that a corresponding reference feature needs to be approximately located on.

A possible implementation could calculate the match probability MP_A between a reference feature (indicated by index 1) against an extracted feature 2 (indicated by index 2) from a current image according to the following formula:

$$MP\_A = 1/\text{sqrt}[(x1-x2)^2 * \text{weightx} + (y1-y2)^2 * \text{weighty} + (z1-z2)^2 * \text{weightz}]$$

where "weight" depends on the propagated uncertainty of the feature position estimate, propagated based on the device's current pose estimation. E.g., if distance is known and height and elevation angle, but no x,y coordinates (designating the 2D position in the image), weightx and weighty are 0, while weightz is non-zero. Weightx, weighty, weightz designate respective weights for the respective x, y, z coordinates.

In other words, MP_A is determined based on the Cartesian distance in space between the reference feature which may be provided via a database or a reference model and the current feature which has been extracted but not yet matched. With increasing distance between the features, the match probability will decrease. This gives a very reliable result, however it is highly dependent on a very good initialization of the pose estimation.

Another implementation may compute the match probability MP_B between the feature descriptor vector 1 of reference feature 1 and the feature descriptor v2 of the extracted feature 2 as known to from state of the art methods:

$$MP\_B = 1/\text{sqrt}[(v1-v2)^2].$$

In other words, MPB considers the similarity between the information provided in the image (e.g. intensity differences).

Advantageously, a possible implementation may combine the two match probability computations described above. For example, MP_A may be computed to determine a limited pre-selection of potential matches and MP_B may then be computed with respect to reference features and current features where MP_A exceeds a certain threshold. Or, MP_B may be computed first to determine a limited pre-selection of potential matches and MP_A may then be computed with respect to reference features and current features.

In a possible implementation, it may be determined based on the uncertainty of the pose estimation which of the match probabilities is to be computed, combined and/or in which order the match probabilities are to be computed. For example, if the uncertainty of the camera pose is low, MP_A may be preferred or prioritized over MP_B, meaning either MP_A or a combination of MP_A and MP_B, where MP_A is used for the pre-selection, may be used.

According to an embodiment, the uncertainty information influences the matching process by changing a respective weight of at least one of individual degrees of freedom regarding the position and/or orientation depending on the uncertainty (e.g. x, y, z in Cartesian coordinates). For example, the uncertainty information influences the selection of reference features as matching candidates to be matched. For example, when having a weight based on which the selection of reference features as matching candidates is influenced, a higher uncertainty may decrease the weight and a lower uncertainty may increase the weight.

For instance, the uncertainty information is determined based on the type of sensor for providing the position, orientation and/or altitude of the capturing device.

Suppose we are provided with a coarse prior on the (partial) pose of the capturing device in a global coordinate system and a reference model (e.g. sparse reference feature set or a triangle mesh) of the environment in the same global coordinate system. We propose to transform (part of) the reference model into a coordinate system associated to the capturing device and to project it onto the camera image plane. The feature detection method then uses this projected information in that it only detects features at those positions in the image that have a projected part of the reference model in their vicinity.

Figure 6:
FIG. 6 displays an image taken with a capturing device of an exemplary scene.

FIG. 6 displays an image of an exemplary scene taken with a capturing device. The imaged scene contains landscape (mountains, coast, sea) and some man-made objects (houses). Using the coarse pose of the capturing device, e.g. from GPS, a digital compass, and an accelerometer, the available reference model RM in the vicinity is rendered with that pose. This model does not contain any information on the mountains or the sea, but exclusively represents the man-made structures in the scene. Based on the projected reference model RM an adaptive region AR is defined that covers the projected reference model and its local vicinity. An approach according to the invention then only detects features inside this region AR, as features detected in other regions of the image are likely to not have any correspondence in the reference model.

Figure 7:
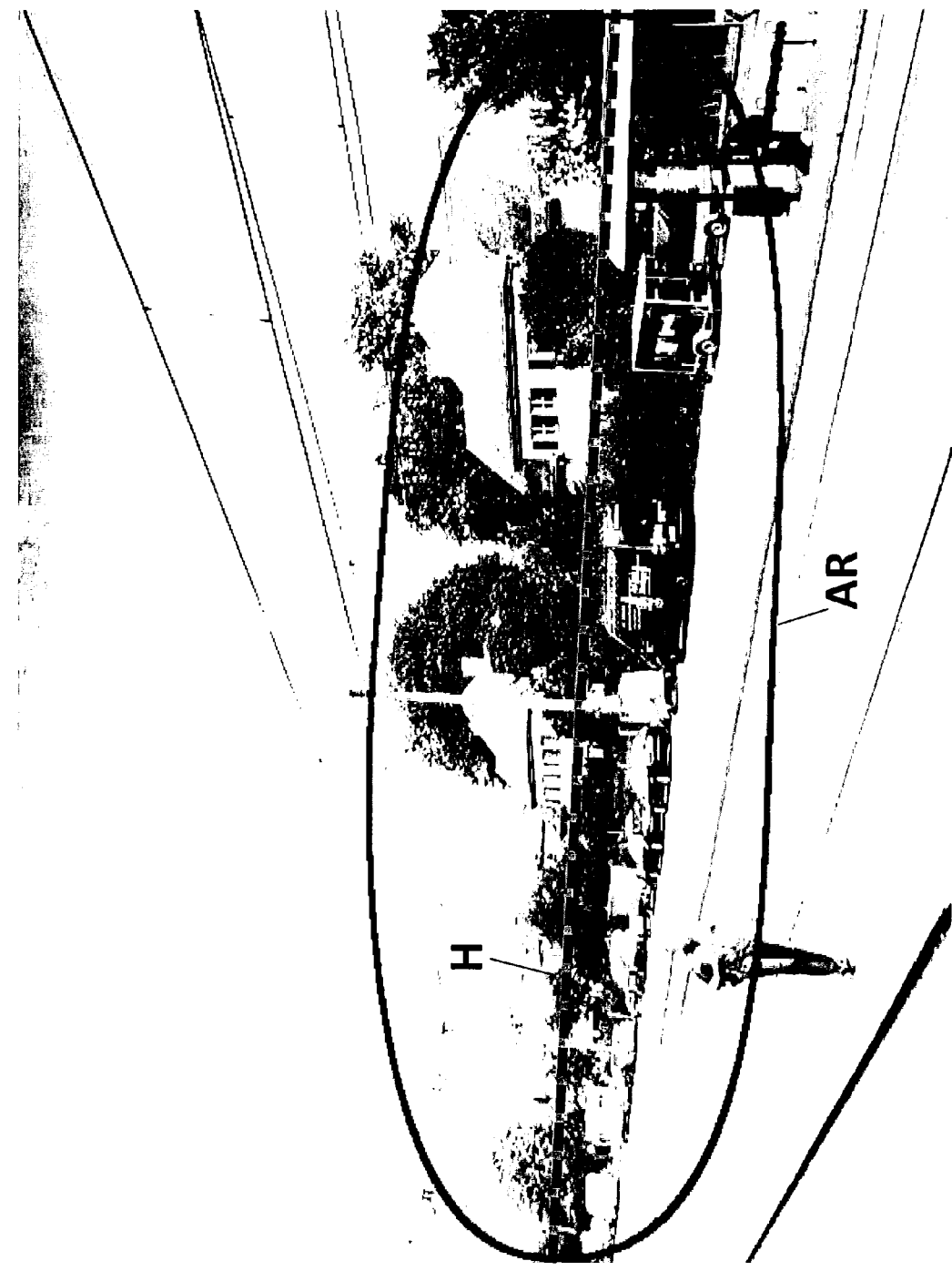
FIG. 7 displays an image taken with a capturing device of another exemplary scene.

FIG. 7 illustrates another implementation showing an image of another exemplary scene taken with a capturing device. Assuming the coarse orientation with respect to gravity of the capturing device only is known, e.g. provided by an accelerometer, a more generic reference model is used, for example the horizon. By projecting the horizon line H into the image under consideration of the known orientation and by only detecting features in an adaptive region AR at the vicinity of this projected line, detecting features at the floor and the sky is avoided. This provides advantages in matching, as features on the floor are usually highly repetitive in outdoor scenarios and features in the sky are obviously useless, as the sky drastically changes appearance over time.

Figure 8:
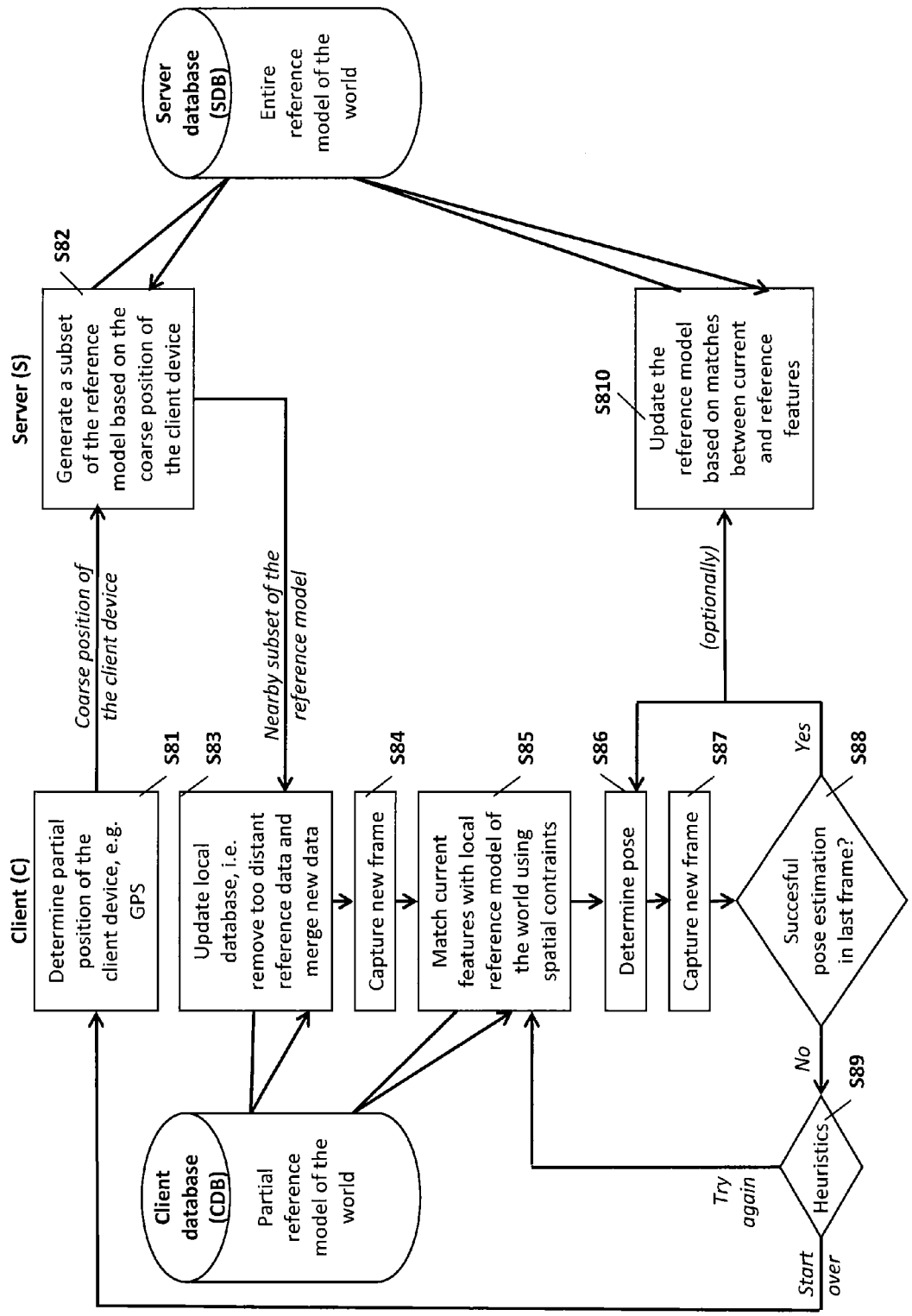
FIG. 8 shows a possible use of a method according to an embodiment of the invention.

According to an embodiment of the invention, the method may be used in a client-server framework where one or more clients, e g running on mobile devices, communicate with a server via network, such as wireless LAN, GSM, or any other wide area network (WAN). FIG. 8 illustrates an exemplary flowchart of the communication between a client C and a server S. After the client C determined its coarse (partial) pose (position and orientation) in step S81, this information is used as a query to the server S. The server S then creates a subset of the reference model in its database SDB depending on the query in step S82. The subset can for instance correspond to the part of the entire reference model which is located nearby the client's (partial) position. The subset is sent as response to the client C which then updates its local database CDB with the retrieved subset in step S83. After capturing a new frame (image) in step S84, current features are detected, described and matched with the local reference model in the local database CDB applying spatial constraints as described above (step S85). The matches are then used to determine the pose of the capturing device in step S86. After capturing a new frame (image) (step S87), the client C proceeds depending on whether the pose estimation was successful or not (step S88). If so, the method estimates the pose of the capturing device relative to the preceding frame (i.e. frame-to-frame tracking), otherwise the client C either creates new current features to try initialize tracking in step S85, or sends a new query to the server S (step S81), depending on some heuristics (step S89). Optionally, the matches that led to a successful pose estimation can be used to update the server database SDB in step S810.

Feature Detection and Feature Description:

A strong limitation of any two-dimensional computer vision method is that it operates in a projected space. This makes it impossible to distinguish scale resulting from the distance of an object to the camera from scale resulting from the actual physical scale of an object. Invariance to scale resulting from the distance of the camera to an object is clearly desirable in many applications, and was the original motivation for scale-invariance. However, in the presence of similar features at different physical scales, invariance to scale makes them indistinguishable. For instance, a descriptor as described in Lowe would not be able to distinguish between a real building and a miniature model of it. Besides that, approaches that provide scale-invariance by computing a repeatable scale of a feature from image intensities are highly depending on the accuracy and repeatability of this computed scale.

According to embodiments of the invention, the method thus also includes a method of detecting and describing features from an intensity image which is invariant to scale resulting from the distance between the capturing device and the object, but is sensitive to the real (physical) scale of an object for a variety of applications. In this regard, various embodiments of such method are possible as set out as follows:

In one embodiment, the method may comprise the steps of providing an intensity image captured by the camera, providing a method for determining a depth of at least one element in the intensity image, in a feature detection process detecting at least one feature in the intensity image, wherein the feature detection is performed by processing image intensity information of the intensity image at a scale which depends on the depth of at least one element in the intensity image, and providing a feature descriptor of the at least one detected feature.

According to an embodiment, the feature descriptor contains at least one first parameter based on image intensity information provided by the intensity image, and contains descriptor coordinates which are scaled depending on the depth of at least one element in the intensity image being a part of the detected feature, or the feature descriptor describes the detected feature based on information provided by the intensity image in a support region around the detected feature, wherein the support region is scaled depending on the depth of at least one element in the intensity image being a part of the detected feature.

According to another embodiment of the invention, the method may include a method of detecting and describing features from an intensity image, comprising the steps of providing an intensity image captured by a camera, providing a method for determining a depth of at least one element in the intensity image, detecting at least one feature in the intensity image based on image intensity information provided by the intensity image, providing a feature descriptor of the at least one detected feature, wherein the feature descriptor contains at least one first parameter based on image intensity information provided by the intensity image, and contains descriptor coordinates which are scaled depending on the depth of at least one element in the intensity image being a part of the detected feature, or wherein the feature descriptor describes the detected feature based on information provided by the intensity image in a support region around the detected feature, wherein the support region is scaled depending on the depth of at least one element in the intensity image being a part of the detected feature.

According to another embodiment of the invention, the method may include a method of detecting and describing features from an intensity image, comprising the steps of providing an intensity image captured by a camera, providing a method for determining a depth of at least one element in the intensity image, detecting at least one feature in the intensity image based on image intensity information provided by the intensity image, and providing a feature descriptor of the at least one detected feature with an indicator of a particular scale, the feature descriptor containing at least one first parameter based on information provided by the intensity image, and at least one second parameter indicative of a combination of the scale and a depth of at least one element in the intensity image being a part of the detected feature. When referring to descriptor coordinates, we refer to the coordinates of the intensity values, from which the descriptor is built in relation to a defined feature center. FIG. 3 helps to understand the concept.

It is thus proposed to utilize the depth of an element in the intensity image (e.g. a pixel) for feature detection and/or description at that particular element (pixel) in an intensity image. Thereby, features can be detected and described at real (physical) scale, providing an improved distinctiveness compared to standard scale-invariant feature descriptors on intensity images without introducing any constraints on the camera movement.

According to an embodiment, in the proposed methods a decision is made in the feature detection process whether at least one element in the intensity image belongs to a detected feature or not depending on intensity values in the intensity image.

Particularly, according to an embodiment of the invention, the proposed methods detect and describe features based on intensity images only. Particularly, the depth of a feature is used to improve the process by relating to a real (physical) scale, but in contrast to the state of the art, any other knowledge of the local geometry around a feature is not used.

The methods according to these embodiments in an aspect use one scalar value only, which is an indication of a distance, to improve the detection and/or description of a feature which is both detected and described solely from the 2D intensity image.

Different methods exist to provide depth information associated to particular pixels in an intensity image. Examples include stereo vision, time-of-flight cameras and approaches using structured light. In the following, we assume that we are provided with an intensity image and a method for determining a depth of at least one element in the intensity image. This method can for instance be a lookup operation in an associated depth map (possibly using interpolation and/or extrapolation) or it can be the computation of depth from stereo given a second intensity image containing the corresponding physical element from a different view.

1. Feature Detection at Real Scale According to an Embodiment of the Invention:

Generally, a method according to this aspect comprises the steps of providing an intensity image captured by a capturing device, providing a method for determining a depth of at least one element in the intensity image, in a feature detection process detecting at least one feature in the intensity image, wherein the feature detection is performed by processing image intensity information of the intensity image at a scale which depends on the depth of at least one element in the intensity image, and providing a feature descriptor of the at least one detected feature.

According to an embodiment, the feature descriptor contains at least one first parameter based on image intensity information provided by the intensity image and at least one second parameter which is indicative of the scale.

According to an embodiment, the feature descriptor contains at least one first parameter based on image intensity information provided by the intensity image, and contains descriptor coordinates which are scaled depending on the depth of at least one element in the intensity image being a part of the detected feature, or the feature descriptor describes the detected feature based on information provided by the intensity image in a support region around the detected feature, wherein the support region is scaled depending on the depth of at least one element in the intensity image being a part of the detected feature.

A feature is a salient element in an image which can be a point (often called keypoint or interest point in the literature), a line, a curve, a region or any other subset of the image. Feature detection algorithms are usually saliency detectors. For example, they find lines, edges, or local extrema of a differential operator. A feature detector can be seen as a function mapping a region of pixels to a response. In the literature, this region is referred to as sampling window, support region or measurement aperture of the feature detector. The response is eventually thresholded to decide which elements are features and which are not. In order to extract features at a certain scale, either the sampling window or support region can be scaled accordingly or the image is scaled with the inverse scale factor before computing the response of the feature detector. The scale (or size) of a feature is then defined as the size of the sampling window or support region used to detect it.

In this context, FIG. 9 illustrates a size of the FAST corner detector (illustration on the left side), as common example for a method to detect point features. In this example, the scale (or size) of a feature F is defined as "scale1" or "scale2" as shown which corresponds to the size of the sampling window or support region (here defined by the circular set of pixels) used to detect it. On the left side of FIG. 9, the image region (here delimited by the circular set of pixels) that contributes to the decision if a pixel is a feature or not (sampling window or support region) is shown at two different scales, scale1 and scale2 designating two different sizes of the support region.

For example, in an aspect of the invention, the method comprises the steps of defining a support region as a region covering a portion of the intensity image, detecting at least one feature in the intensity image based on information in the support region around the feature, wherein a size of the support region is determined in correspondence with the scale at which the at least one feature is detected.

According to an embodiment, the scale at which the at least one feature is detected depends on a depth sample for the support region. For example, the support region is scaled inversely proportional to the depth of at least one element in the intensity image for which the feature detection process determines whether it is a part of the detected feature.

Common examples for feature detection methods include Laplacian of Gaussian (LoG), Difference of Gaussians (DoG), Determinant of Hessian (DoH), Maximally stable extremal regions (MSER), Harris features, or learning-based corner detectors such as FAST. To detect edge features, widely known algorithms such as Canny, Sobel or Prewitt can be applied.

For example, feature detection is performed at at least one scale that depends inversely proportional on the depth of at least one element in the intensity image for which the feature detection process determines whether it is a part of a detected feature.

According to an embodiment, the at least one scale at which the at least one feature is detected corresponds to a physical size of the feature.

In one possible implementation of this invention, it is proposed to make the decision if an element is a feature or not depending on the values in the intensity image and the depth of that element. More specifically, for each detected element, the feature detection is carried out at one or more scales that depend inversely proportional on the depth of the putative element.

In one implementation of the invention, the feature detection only uses one real scale (e.g. in mm) to detect features. In another implementation, more than one real scales (e.g. in mm), which depend on the depth are used to detect features (e.g. 30 mm and 60 mm for features further away than 50 cm and closer than 100 cm). Therefore, while the image scale (in pixels) is turned to real scale, for example by making it inversely proportional to the depth, the physical or real scale in metric distances can be scaled differently and independently.

Thereby, the scale(s) at which features are detected correspond to a real (physical) size instead of a scale in camera pixel units.

An estimate of the focal length of the capturing device is needed to detect features at absolute real scales.

FIG. 10a shows a flow diagram of an exemplary embodiment of this approach according to this aspect of the invention. Step S51 captures an intensity image with a capturing device, such as a camera, or loads an intensity image, and provides a method to determine the depth of at least one element, such as a particular pixel, in the intensity image (regarding possible implementations of such a method, further details are provided above). Step S52, which defines at which scales to extract features, is depending on depth samples. For each support region, which can be as small as a pixel, the scale(s) at which to detect features in the intensity image depend(s) on a depth sample for the region. In one embodiment of the invention the support region consists of more than 8 pixels. As explained above, one possible way of determining scales from the depth is an inversely proportional relationship which results in real (physical) scales. Afterwards, step S53 generates representations of the provided intensity image for different scales. In step S54, features are detected at the desired scales. Particularly, in the feature detection process respective representations of the intensity image for different scales are generated and features in the intensity image are detected at the respective scales. For feature description, at least one orientation is assigned in step S55, e.g. as the dominant gradient direction of neighboring pixels or using an orientation sensor measurement, e.g. aligned with the gravity force. Eventually, the features are described in step S56 considering their scale and orientation and step S57 uses the described features as in the standard approach.

Note that particularly steps S53 and S54 are exemplary. Any method that allows detecting features at different scales can be applied here, including those methods that scale their sampling apertures (or support regions) instead of working on scaled versions of the intensity image.

An embodiment of the invention uses point features (i.e. keypoints or interest points). The feature detection is in this case performed with a method that decides for a single point in an image (i.e. a pixel) if it is a feature or not based on the image intensities in a sampling window around the point.

For example the FAST corner detector, which is frequently used as feature detector, would be used in an implementation of the invention as follows. Given a pixel, the detector determines if it is a feature (corner) or not depending on its intensity and the intensities of pixels on a circle around it with a radius of 3.5 pixels. The proposed method would first determine the depth of that pixel from a depth-providing method. Given this depth ($Depth_{real}$, a desired real scale ($Radius_{real}$), and the focal length of the capturing device in pixels (Focal-Length$_{pixel}$), the diameter or radius in pixels ($Radius_{pixel}$) corresponding to the desired real scale can be computed as follows:

$$Radius_{pixel} = FocalLength_{pixel} * Radius_{real} / Depth_{real}$$

As explained above, the scale in the image corresponding to some real scale on the sur-face varies inversely proportional to the depth. This is one possible way of determining scales from the depth.

To detect a feature at the real scale which corresponds to the radius $Radius_{real}$ for the FAST corner detector, either a modification of the original detector would be used that operates with a radius of $Radius_{pixel}$ pixels instead of the default 3.5 pixels, or a patch around the candidate pixel with a radius of $Radius_{pixel}$ is scaled by a factor of $Radius_{pixel}/3.5$, and detection is carried out with the standard detector on that scaled image patch.

Instead of providing an individual scale for each depth, it might be computationally advantageous to assign a range of depths to a scale. E.g. the range of 5-10 m is assigned the scale of 100 mm and the range above 10 m is assigned to 300 mm.

Another possible embodiment of the invention might use other depth-indicating values, instead of the depth, as described above. One embodiment uses the z-value of a Cartesian coordinate system centered at the camera, where the z-axis is collinear with the camera's optical axis.

In general, it is also clear, that the depth or distance, does not have to be exactly measured from the camera's center.

Optionally, the image, or part of the image, can be undistorted, according to additional intrinsic parameters before the features are extracted or the descriptor is built.

The present invention does not need the expensive steps of normal computation (which requires dense depth data), back-projection of the image into 3D, and triangulation. Instead of an image mesh, the approach of the invention uses a simple 2D intensity image for creating scale spaces. It does not perform any normalization of the neighborhood based on the tangent plane and also does not consider the normal in the feature description at all.

Particularly, according to the invention, during the feature detection process no 3D mesh based on the depth data is created.

2. Feature Description at Real Scale According to a Further Embodiment of the Invention:

Generally, a method according to this aspect comprises the steps of providing an intensity image captured by a camera, providing a method for determining a depth of at least one element in the intensity image, detecting at least one feature in the intensity image based on image intensity information provided by the intensity image, and providing a feature descriptor of the at least one detected feature.

In a first possibility, the feature descriptor contains at least one first parameter based on image intensity information provided by the intensity image, and contains descriptor coordinates which are scaled depending on the depth of at least one element in the intensity image being a part of the detected feature.

Alternatively, in a second possibility the feature descriptor describes the detected feature based on image intensity information provided by the intensity image in a support region around the detected feature, wherein the support region is scaled depending on the depth of at least one element in the intensity image being a part of the detected feature.

A feature descriptor describes a feature based on the available information in a support region of the image around the feature. The scale of a feature descriptor is the size of that support region. For clarity and as an example, FIG. 9 illustrates on the right side of the illustration the support region of a SIFT descriptor (here defined by a frame or rectangle with a contrast gradient depicted as straight line) at two different scales, scale3 and scale4 designating different sizes of the support region, here of the frame or rectangle.

The scale of a descriptor is usually chosen linearly depending on the scale of the feature to describe. In one preferred embodiment of this invention, the supporting pixels used for building the feature descriptor consist of pixels specified by a geometry around a pixel (e.g. on the edge of a circle, or all pixels inside an ellipse), which has been identified as a feature, where the geometry only varies according to depth. The variation can be resizing the geometry or changing the shape of the geometry at different depths. Different depths can be intervals, for example 0-0.5 m and 0.5 m-5 m and above 5 m. Note, that by support region we refer to the part of the support region that has non-zero contribution weights.

For example, supporting points in the intensity image are used for providing the feature descriptor which comprise points specified by a geometry around one of the points which has been identified in the feature detection process as being a part of the detected feature, wherein the geometry varies according to the depth of the one of the points, particularly wherein the variation can be resizing the geometry or changing the shape of the geometry at different depths.

According to an embodiment, support regions at different real scales are used, wherein of these support regions a support region is determined to be smaller at a smaller determined depth and larger at a greater determined depth.

A feature descriptor can be a real-numbered vector, e.g. SIFT or SURF, but can also be classification-based approach such as random FERNS. In addition, statistical descriptors, like curvature or (physical) length of a contour can be used. In essence, any method that enables matching of features is considered a feature descriptor in the parlance of this disclosure.

According to an embodiment, it is proposed to describe a feature depending on the values in the intensity image and the depth of the feature, provided by the method described above. More specific implementations of this proposal are explained below.

According to an embodiment, the support region of the feature descriptor is scaled inversely proportional to the depth of at least one element in the intensity image being a part of the detected feature.

According to another embodiment, the descriptor coordinates of the feature descriptor are scaled inversely proportional to the depth of at least one element in the intensity image being a part of the detected feature.

Particularly, it is proposed to scale the coordinates or the support region of the feature descriptor inversely proportional to the depth of the feature. This results in the scale of the feature descriptor corresponding to a real scale and does not only improve repeatability of feature descriptor scale but also enables distinguishing similar features at different physical scales.

If the real scale should correspond to an absolute scale that could be used across different devices, an estimate of the focal length of the capturing device is needed. The scale in pixels ($S_{pixels}$) corresponding to an absolute real scale ($S_{real}$) at a certain distance ($Depth_{real}$) is then computed as $$S_{pixels} = FocalLength_{pixels} * S_{real} / Depth_{real}.$$

FIG. 10b shows a flow diagram of a method according to an embodiment of this aspect of the invention. After capturing an intensity image with a capturing device or loading an intensity image and providing a method that gives the depth of a requested pixel in step S61, features are detected in step S63 at scales defined in step S62. These scales do not have a known relation to real (physical) scales but are defined in image coordinates. For describing a feature in step S65, we incorporate the depth of the feature provided by the depth-providing method. The depth is used to scale the descriptor coordinates to correspond to a real scale, as explained above. After orientation assignment in step S66, the features are described using the descriptor scale corresponding to a real scale in step S67. Eventually, the described features are used in an application in step S68. In possible implementations of the invention, features are extracted in order to provide depth (e.g. using a stereo camera). In that case, the features can immediately be passed to step S65 and steps S62, S63 and S64 (i.e. feature extraction FE corresponding to steps S53 and S54 in FIG. 10a) do not have to be conducted (any more).

An embodiment of the method proposed in this section uses point features (i.e. keypoints or interest points) and feature descriptors for such features. Given a 2D point in an image, a scale and optionally an orientation, it computes a descriptor, which can for instance be represented by a real-valued vector based on the intensity values in the support region around a feature. Popular examples of such methods include SIFT and SURF.

To support handling scenes with strong depth variations, we propose to define multiple desired feature descriptor scales that correspond to real scales. So one possible embodiment of the invention uses different real scale support regions, where the support region is smaller at smaller depths and larger at higher depth values. For example, a support region of 50 mm×50 mm does not make sense when imaging a far away mountain, as it would cover way less than a pixel. On the other hand, a support region of 10000 mm×10000 mm might make sense for such a scene, while it is clearly unfeasible in an indoor desktop environment.

According to an embodiment as described above in section 1 and/or in this section 2, the scale is defined as a global setting and the feature descriptor does not contain at least a second parameter indicative of the scale and/or of the support region.

3. Scale-Invariant Real-Scale-Aware Feature Description According to a Further Embodiment of the Invention:

According to this aspect of the invention, it is proposed to define the scale of a feature descriptor based on the intensity image as done in standard approaches. The method according to this aspect comprises the steps of providing an intensity image captured by a camera, providing a method for determining a depth of at least one element in the intensity image, detecting at least one feature in the intensity image based on image intensity information provided by the intensity image, and providing a feature descriptor of the at least one detected feature with an indicator of a particular scale. The feature descriptor contains at least one first parameter based on image intensity information provided by the intensity image and at least one second parameter indicative of a combination of the scale and a depth of at least one element in the intensity image being a part of the detected feature.

For example, the second parameter is indicative of a product of the scale and the depth of at least one element in the intensity image being a part of the detected feature.

According to an embodiment, the second parameter, which optionally includes information about a focal length of the capturing device, is used as a basis for a selection step in a subsequent feature matching process in which only those features of another intensity image are considered as possible matches for the detected feature that have a feature descriptor including at least one parameter similar to the at least second parameter.

Preferably, the second parameter is invariant to a distance of a detected feature to the capturing device.

According to an embodiment, the feature descriptor contains in addition to a description of the intensity image in a support region around the feature a scalar value, for example s*d. Thereby s denotes the scale of the feature descriptor and d is the depth of the feature. While this value is ideally invariant to the distance of a feature to the capturing device, it provides a distinct description of a feature. If the depth d (or distance) of a feature doubles, the size of this feature in the intensity image, and therefore its scale s will decrease by half. It is clear to the skilled person that the focal length does not matter as long as it is constant. But in a general case, where any camera can be used, it matters. Thus, the constant would be (s*d)/f instead, where f is the focal length. This is important in order to ensure the interoperability of the data between cameras with differing focal lengths. The product of scale and depth (and optionally focal length) can for instance be used to speed up feature matching by only considering those features as possible matches that have a similar s*d value.

FIG. 10c shows a flow diagram of a method according to an embodiment of this aspect of the invention. After capturing an intensity image with a capturing device or loading an intensity image in step S71 and providing a method to gain depth samples of particular points in the intensity image, a scale space of the intensity image is created in step S73 at scales defined in step S72. In step S74, features are extracted from the scale space images. For every feature, an orientation is assigned in step S75 and a description is computed in step S76. Note, that the method so far does not differ from a regular scale-invariant method such as SIFT. In the following step S77, according to the invention the depth of the feature provided by a method provided in step S71 is incorporated. In this case, the depth forms a part of the descriptor and is multiplied with the feature scale and optionally the focal length, as explained above. Eventually, the described features are used in an application in step S78. In possible implementations of the invention, features are extracted in order to provide depth (e.g. using a stereo camera). In that case, the features can immediately be passed to step S75 and steps S72, S73 and S74 (i.e. feature extraction FE) do not have to be conducted (any more).

Figure 11:
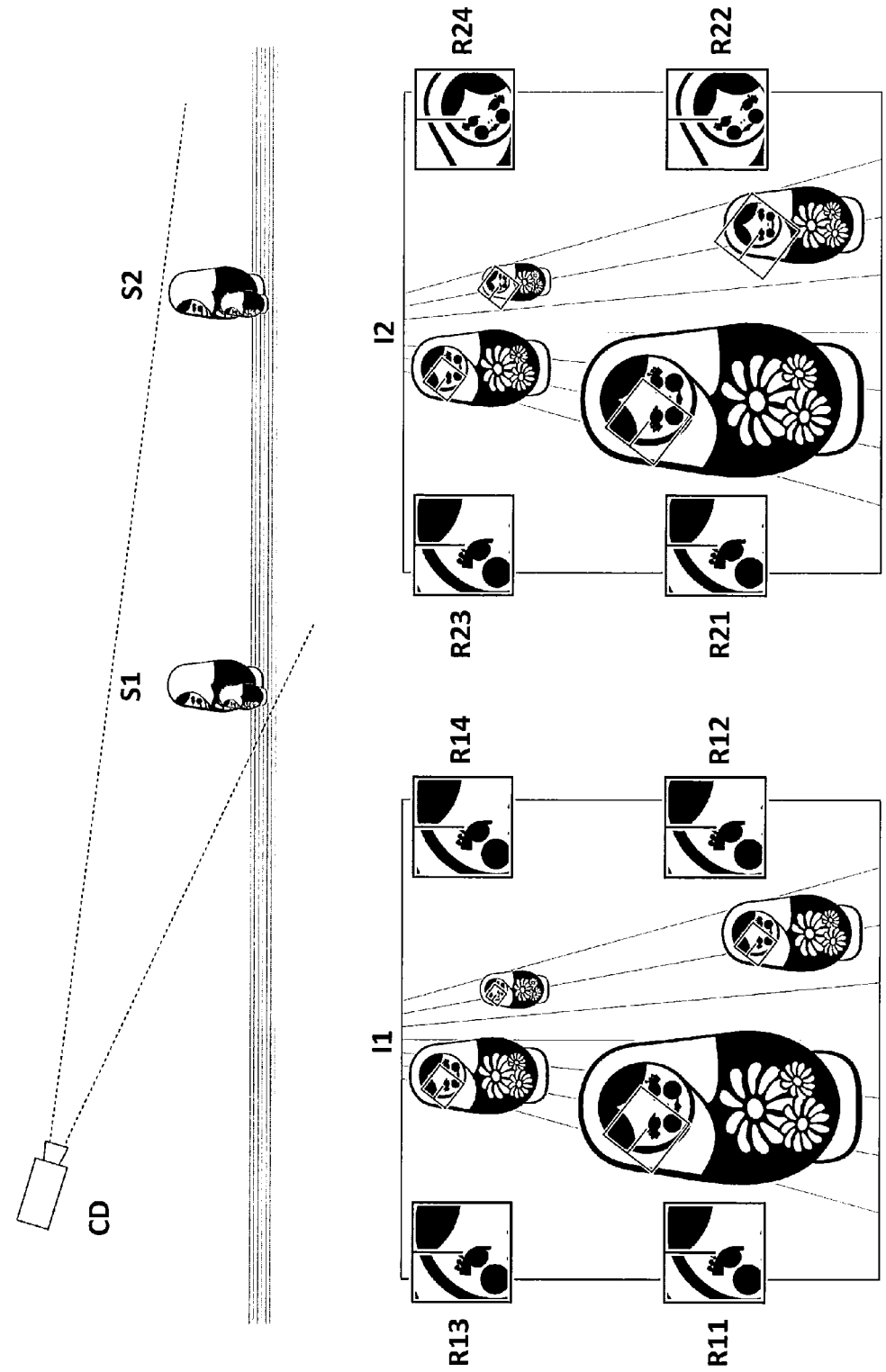
FIG. 11 illustrates an exemplary scene which compares a technique according to embodiments of the invention with standard approaches showing a setup where a capturing device captures a scene consisting of two sets of dolls.

Depiction of exemplary results: FIG. 11 compares the technique according to the above described aspects of the invention (as referred to in points 1-3) with standard approaches at a setup where a capturing device CD captures a scene consisting of two sets of dolls, S1 and S2. Each set contains two similar dolls at different scales (i.e. a tall doll and a smaller doll). The two sets S1 and S2 are located at different distances from the capturing device CD. The left figure I1 illustrates an image captured with CD. The overlaid squares indicate the support regions of a standard scale-invariant feature descriptor for features located at the right eye of every doll. The insets R11, R12, R13 and R14 show the parts of the image covered by the support regions of the individual features. As can be seen, they are all identical as a result of invariance to scale. While this enables matching features of an object at different distances e.g. R11 and R13, it does not provide discrimination between similar objects at different physical scales, e.g. R11 and R12.

In contrast, I2 shows the same captured image with support regions of four features at the right eye of each doll, scaled with a proposed method according to the invention. While the support region and therefore the descriptor is invariant to the distance of an object from the camera, e.g. R21 and R23 or R22 and R24, it differs for similar objects at different scales. For example the support region R21 and R22 clearly differ in their image content, which results in distinct feature descriptors.

According to an embodiment of the invention, for providing the reference and/or current depth samples a method for determining a depth of at least one element in the intensity image is based on an optical focus of the capturing device.

According to another embodiment of the invention, in the method for determining a depth of at least one element in the intensity image, depth samples of elements in the intensity image are generated by extracting features of the intensity image and at least one further intensity image and matching them using the epipolar geometry of a stereo-camera pair capturing the intensity image and the at least one further intensity image. In this case where the features are extracted in order to provide depth (e.g. using a stereo-camera) the extracted features can immediately be used for the feature description. For example, in a first step, two intensity images I1 and I2 are captured by a camera or loaded which may then optionally be subject to pre-processing. After a scale space or a set of discrete scales has been defined, features are detected in that scale space in I1 and/or I2 and correspondences are determined, for example using the epipolar geometry of the stereo-camera pair or scale-invariant feature descriptors for a mono-camera setup. A detected features correspondence $C(F1(x,y), F2(x,y))$ with Fi designating the two corresponding features and x, y designating a 2-dimensional position of the respective feature Fi is considered to describe projections of the same point in 3D space into I1 and I2 and thus, the depth, i.e. the position in 3D space of this point can be computed for example by triangulation. Before using the described features eventually in an application, the extracted features or keypoints K are described. The description contains the descriptor v, which is created from intensity data. In addition, it can make sense, depending on the application, to store their position in the image (x,y) or their 3D position (can be calculated from depth). Optionally, the scale s, orientation o and determined depth d may also be stored with respect to the keypoints. In order to employ this embodiment of the invention, it is not necessary to store the scale as part of the descriptor. For example, scale could also be defined globally to 10 mm or 1000 mm for certain depths or using a general formula dependent from the depth d, which applies to all features in the application. As described above with respect to FIGS. 10b and 10c, either a method according to an embodiment of the invention as described in above section 2 (for example, starting from S65 in FIG. 10b) or section 3 (for example, starting from S75 in FIG. 10c) may be used. In case of an embodiment according to section 3, K will also further comprise a value derived from combining s and d (and optionally the camera's focal length).

According to a further embodiment of the invention, the depth of at least one element in the intensity image is estimated using visual search algorithms to initially compare different distances.

According to an embodiment of the invention, the method may further comprise the steps of providing a measurement of a position and orientation of the capturing device in a global coordinate system, determining a pose of the capturing device from the measurement, providing a 3D model of an environment, wherein the pose is used in combination with the 3D model to compute the depth of at least one element of a feature in the intensity image, for example by means of casting a virtual ray from the capturing device center through the feature into the 3D model.

Measurements of position of the capturing device in a global coordinate system may be provided by a GPS sensor/receiver, IR or RFID triangulation, or by means of localization methods using a broadband or wireless infrastructure. Measurements of orientation of the capturing device in a global coordinate system may be provided by at least one of an inertial sensor, an accelerometer, a gyroscope, a compass, or a mechanical, electromagnetic, acoustic, or optical tracking system. In the context of the invention, an inertial sensor may, e.g. continuously, provide sensor information including the position and/or orientation of an object or device with regard to the environment, by using any combination of the following: magnetometer (e.g. a compass), motion sensor/rotation sensor (accelerometers/gyroscopes), gravity sensor, and other sensors providing such information.

Possible combinations of a depth providing methods with real scale feature descriptors may be used in optical pose estimation and tracking, for example in order to create outdoor AR experiences. For example, depth is extracted using rough sensor data and an environment model. An intensity image I1 is captured by a capturing device or loaded. In addition, an initial pose of the capturing device while capturing I1 is estimated from rough sensor measurements such as GPS position and orientation sensor information. Finally, an advanced environment model including 3D data and image data (similar to Google Streetview) is provided. Image data is only necessary, if a reference model for tracking (e.g. already containing feature 3D coordinates and feature descriptors) has not been created in advance. The environment model is loaded using the assumed camera pose, i.e. the environment model is rendered from the camera viewpoint of intensity image I1. Depth information is retrieved from the environment model and used in a next step for calculating the real scale descriptors of detected features. In other words, using the depth information registered with the image I1, real scale features are extracted at a fixed scale of, for example 1 m. Because the environment model combines 3D data and image data, a reference 3D model of physical scale features with a scale of 1 m can be created (this can of course be done in advance). The results can then be used to create correspondences of features in I1 and 3D physical scale features. Using an optimization algorithm, the refined pose of I1 in the environment model's coordinate system can be calculated. The refined pose can then be used for an application, e.g. an Augmented Reality visualization of tourist data, or optionally be used to refine the pose estimation and iterate through the process, until the change in pose has gone below a defined quality threshold.

While the invention has been described with reference to exemplary embodiments and applications scenarios, it will be understood by those skilled in the art that various changes may be made and equivalents may be substituted for elements thereof without departing from the scope of the claims. Therefore, it is intended that the invention not be limited to the particular embodiments disclosed, but that the invention will include all embodiments falling within the scope of the appended claims and can be applied to various application in the industrial as well as commercial field.

What is claimed is:

1. A method of matching image features with reference features, comprising:
    providing a current image captured by a capturing device;
    providing a set of reference features, wherein each of the reference features comprises at least one first parameter which is at least partially indicative of a position and/or orientation of the reference feature with respect to a global coordinate system, wherein the global coordinate system is an earth coordinate system or an object coordinate system, or which is at least partially indicative of a position of the reference feature with respect to an altitude;
    detecting at least one feature in the current image in a feature detection process;
    associating, with the detected feature, at least one second parameter which is at least partially indicative of a position and/or orientation of the detected feature with respect to the global coordinate system, or which is at least partially indicative of a position of the detected feature with respect to an altitude; and
    matching the detected feature with at least one of the reference features of the set of reference features by determining a similarity measure between the at least one first parameter and the at least one second parameter.

2. The method according to claim 1, including defining a search space with a reduced number of reference features within the set of reference features when matching the detected feature, wherein the search space is determined based on the at least one second parameter.

3. The method according to claim 1, wherein the global coordinate system provides information about a geo-referenced position and/or orientation of a feature.

4. The method according to claim 1, wherein at least one of the at least one first and second parameters is at least partially indicative of a longitude and a latitude.

5. The method according to claim 1, wherein at least one of the at least one first and second parameters is at least partially indicative of a position with respect to a relative altitude relative to the capturing device, or an absolute altitude.

6. The method according to claim 1, wherein the position and/or orientation of the detected feature is described by an equation that describes a geometric shape, wherein the geometric shape comprises at least one of a point, a ray, a straight line, a circle, a cone, or a cylinder.

7. The method according to claim 6, wherein matching the detected feature with the set of reference features comprises only considering those reference features of the set of reference features as possible matches that have a position whose distance to the geometric shape is below a threshold.

8. The method according to claim 1, wherein at least one of the at least one first and second parameters is part of a spatial data structure in a feature descriptor domain and/or in a spatial domain, wherein the spatial data structure includes a bounding volume, such as axis-aligned boxes, oriented boxes, spheres, arbitrary volumes, or a grid, or any kind of tree, such as Quadtrees, Octrees, BSP-trees, kd-trees, R-trees.

9. The method according to claim 1, wherein the at least one second parameter is determined using an at least partial position and/or orientation of the capturing device with respect to the global coordinate system when capturing the current image.

10. The method according to claim 9, wherein the at least one second parameter is determined by further using a set of intrinsic parameters of the capturing device and a position of the detected feature in the current image.

11. The method according to claim 1, wherein the at least one second parameter is determined using a depth of at least one element in the current image being a part of the detected feature.

12. The method according to claim 1, wherein the at least one second parameter is determined using a measurement of a gravity vector in a coordinate system associated to the capturing device and a depth of at least one element in the current image being a part of the detected feature.

13. The method according to claim 12, wherein the position of the detected feature is at least partially described by a plane having a normal being or corresponding to the gravity vector, with the plane indicative of the altitude.

14. The method according to claim 1, further comprising calculating a 3-dimensional position of the detected feature with respect to the global coordinate system or a coordinate system of the capturing device by combining a determined distance between the detected feature and the capturing device and the orientation of the capturing device.

15. The method according to claim 1, wherein the set of reference features is taken from at least one reference image which has been recorded with a second capturing device different from the capturing device.

16. The method of claim 15, wherein the capture time of the at least one reference image is at least one day older than the capture time of the current image.

17. The method according to claim 1, further comprising providing at least a partial position, orientation and/or altitude of the capturing device, thereby deriving an uncertainty information associated with the at least one second parameter of the detected feature.

18. The method according to claim 17, wherein the uncertainty information is used to influence the matching process.

19. The method according to claim 18, wherein the uncertainty information influences the matching process by changing a respective weight of at least one of one or more individual degrees of freedom regarding the position and/or orientation depending on the uncertainty.

20. The method according to claim 18, wherein the uncertainty information influences the selection of reference features as matching candidates to be matched.

21. The method according to claim 20, further providing a weight based on which the selection of reference features as matching candidates is influenced, wherein a higher uncertainty decreases the weight and a lower uncertainty increases the weight.

22. The method according to claim 17, wherein the uncertainty information is determined based on a type of sensor for providing the position, orientation and/or altitude of the capturing device.

23. The method according to claim 1, further including using a matching result for one or more of:
    detection, classification, or localization of an object in the current image;
    localization of the capturing device in the global coordinate system;
    initial pose estimation of the capturing device; and
    initializing pose tracking of the capturing device.

24. The method according to claim 1, wherein the method is used in an augmented reality application.

25. A non-transitory computer readable medium comprising software code sections adapted to perform a method of matching image features with reference features, comprising:
    providing a current image captured by a capturing device;
    providing a set of reference features, wherein each of the reference features comprises at least one first parameter which is at least partially indicative of a position and/or orientation of the reference feature with respect to a global coordinate system, wherein the global coordinate system is an earth coordinate system or an object coordinate system, or which is at least partially indicative of a position of the reference feature with respect to an altitude;
    detecting at least one feature in the current image in a feature detection process;
    associating with the detected feature at least one second parameter which is at least partially indicative of a position and/or orientation of the detected feature with respect to the global coordinate system, or which is at least partially indicative of a position of the detected feature with respect to an altitude; and
    matching the detected feature with at least one of the reference features of the set of reference features by determining a similarity measure between the at least one first parameter and the at least one second parameter.

* * * * *